US012406797B2

(12) United States Patent
Arimitsu et al.

(10) Patent No.: US 12,406,797 B2
(45) Date of Patent: Sep. 2, 2025

(54) COIL DEVICE

(71) Applicant: TDK CORPORATION, Tokyo (JP)

(72) Inventors: Kazunori Arimitsu, Tokyo (JP); Nobuo Kitajima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 840 days.

(21) Appl. No.: 17/375,370

(22) Filed: Jul. 14, 2021

(65) Prior Publication Data

US 2022/0020527 A1 Jan. 20, 2022

(30) Foreign Application Priority Data

Jul. 15, 2020 (JP) ................................. 2020-121127
Jul. 15, 2020 (JP) ................................. 2020-121128

(51) Int. Cl.
*H01F 27/29* (2006.01)
*H01F 27/255* (2006.01)
*H01F 27/28* (2006.01)

(52) U.S. Cl.
CPC ......... *H01F 27/292* (2013.01); *H01F 27/255* (2013.01); *H01F 27/2828* (2013.01)

(58) Field of Classification Search
CPC .. H01F 27/292; H01F 27/255; H01F 27/2828; H01F 2017/046; H01F 17/045; H01F 27/2852; H01F 2017/048; H01F 27/29; H01F 27/306
See application file for complete search history.

(56) References Cited

U.S. PATENT DOCUMENTS

| | | | | |
|---|---|---|---|---|
| 8,723,629 | B1 | 5/2014 | Liu et al. | |
| 10,319,514 | B2 * | 6/2019 | Takagi | H01F 3/10 |
| 11,424,070 | B2 | 8/2022 | Someya et al. | |
| 11,521,787 | B2 | 12/2022 | Someya et al. | |
| 2010/0253456 | A1 | 10/2010 | Yan et al. | |
| 2011/0005064 | A1 | 1/2011 | Klesyk et al. | |
| 2013/0154780 | A1 | 6/2013 | Yamada et al. | |
| 2014/0002227 | A1 | 1/2014 | Hsieh et al. | |
| 2016/0247626 | A1 | 8/2016 | Kawarai et al. | |
| 2016/0351323 | A1 | 12/2016 | Wakamori et al. | |
| 2017/0221623 | A1 | 8/2017 | Kawarai et al. | |
| 2017/0229232 | A1 | 8/2017 | Takagi et al. | |
| 2018/0174740 | A1 | 6/2018 | Muneuchi | |
| 2019/0392977 | A1 | 12/2019 | Kawarai et al. | |
| 2020/0194161 | A1 | 6/2020 | Hu et al. | |
| 2020/0303115 | A1 | 9/2020 | Satou | |

FOREIGN PATENT DOCUMENTS

| | | | | |
|---|---|---|---|---|
| CN | 1892932 A * | 1/2007 | | H01F 3/12 |
| JP | H02-118919 U | 9/1990 | | |
| JP | H03-51807 U | 5/1991 | | |

(Continued)

OTHER PUBLICATIONS

U.S. Appl. No. 17/375,353, filed Jul. 14, 2021 in the name of Kazunori Arimitsu et al.

(Continued)

*Primary Examiner* — Tuyen T Nguyen
(74) *Attorney, Agent, or Firm* — Oliff PLC

(57) ABSTRACT

An inductor includes a coreless coil and terminals connected to end portions of the coreless coil. Positioning portions regulating the position of the coreless coil are formed at the terminals.

7 Claims, 22 Drawing Sheets

(56) References Cited

FOREIGN PATENT DOCUMENTS

| | | | |
|---|---|---|---|
| JP | H08-255717 | A | 10/1996 |
| JP | H10-22137 | A | 1/1998 |
| JP | 2001-155932 | A | 6/2001 |
| JP | 2002-313631 | A | 10/2002 |
| JP | 2006-128473 | A | 5/2006 |
| JP | 2007-165779 | A | 6/2007 |
| JP | 2008-041924 | A | 2/2008 |
| JP | 2011-243703 | A | 12/2011 |
| JP | 2013-125896 | A | 6/2013 |
| JP | 2016-157751 | A | 9/2016 |
| JP | 2018-133402 | A | 8/2018 |
| JP | 2019-057722 | A | 4/2019 |
| JP | 2020-013856 | A | 1/2020 |

OTHER PUBLICATIONS

U.S. Appl. No. 17/375,740, filed Jul. 14, 2021 in the name of Kazunori Arimitsu et al.
U.S. Appl. No. 17/375,760, filed Jul. 14, 2021 in the name of Kazunori Arimitsu et al.
May 9, 2024 U.S. Office Action issued in U.S. Appl. No. 17/375,740.
Apr. 10, 2024 Office Action Issued in U.S. Appl. No. 17/375,760.
Jun. 21, 2024 U.S. Office Action issued in U.S. Appl. No. 17/375,353.
Aug. 21, 2024 Notice of Allowance issued in U.S. Appl. No. 17/375,760.
Sep. 26, 2024 Notice of Allowance received in U.S. Appl. No. 17/375,353.
Sep. 30, 2024 Notice of Allowance received in U.S. Appl. No. 17/375,740.

* cited by examiner

COIL DEVICE

BACKGROUND OF THE INVENTION

1. Field of the Invention

The present invention relates to a coil device used as, for example, an inductor or the like.

2. Description of the Related Art

The coil devices described in, for example, JP H10-22137 A and JP 2007-165779 A are known as a coil device used as an inductor or the like. The coil device described in JP H10-22137 A has a core, a coil wound around the columnar portion (winding core portion) of the core, and a terminal to which an end portion of the coil is connected. A projection is formed at a part of the terminal. By the projection abutting against the outside surface of a lower flange portion, a positional deviation of the terminal with respect to the core can be prevented.

In addition, the coil device described in JP 2007-165779 A has a coil, a terminal to which an end portion of the coil is connected, and a core covering the connecting wire portion of the terminal together with the coil. In the coil device described in JP 2007-165779 A, the connecting wire portion is disposed in the core. Accordingly, the connecting wire portion can be protected from an external factor such as an external force.

By the way, in the coil device described in JP H10-22137 A, the coil may be combined with the core together with the terminal in a state where the end portion of the coil is connected to the terminal during the manufacturing of the coil device. In this case, the coil may be positionally deviated with respect to the terminal. Then, a problem such as contact of the columnar portion of the core with the inner peripheral surface of the coil may arise when the terminal is disposed at a predetermined position of the core. As a result of the problem, the inductance characteristics of products may become uneven and a decline in the reliability of the coil device may arise.

In addition, in a case where a coil formed by winding a flat wire flatwise is used in the coil device described in JP 2007-165779 A, the end portion of the coil needs to be twisted for the end portion of the coil to be connected to the terminal. However, the inductance characteristics of products may become uneven and a decline in the reliability of the coil device may arise in this case as well.

SUMMARY OF THE INVENTION

The present invention has been made in view of such circumstances, and an object of the present invention is to provide a highly reliable coil device.

In order to achieve the above object, a coil device according to a first aspect of the present invention includes:

a coreless coil; and a terminal connected to an end portion of the coreless coil, in which a projection regulating a position of the coreless coil is formed on the terminal.

In the coil device according to the present invention, the projection regulating the position of the coreless coil is formed on the terminal. Accordingly, when the end portion of the coil is connected to the terminal, the position of the coil with respect to the terminal is regulated by the projection and a positional deviation of the coil with respect to the terminal can be prevented. Further, when the terminal is disposed at a predetermined position of the core together with the coil in this state, the coil is smoothly inserted into the columnar portion (winding core portion) of the core and a problem such as contact of the columnar portion of the core with the inner peripheral surface of the coil can be prevented. As a result, according to the present invention, unevenness between products in inductance characteristics attributable to the problem can be prevented and the highly reliable coil device can be realized. In addition, the manufacturing of the coil device can be facilitated by such a problem being prevented.

Preferably, the projection is disposed in a vicinity of an outer periphery of the coreless coil. With such a configuration, the deviation width of the position of the coil with respect to the terminal can be reduced and a positional deviation of the coil with respect to the terminal can be effectively prevented.

Preferably, the projection does not abut against an outer peripheral surface of the coil. With such a configuration, in a case where an insulating film is formed on, for example, the outer surface of the coil, damage to the insulating film attributable to friction with the projection can be prevented and short circuit failure is unlikely to occur between the terminal and the coil (outer peripheral surface of the coil).

Preferably, the coil device includes a core having a columnar portion insertable into the coreless coil. With such a configuration, the effective magnetic permeability of the core in the region inside the coil can be sufficiently ensured and the inductance characteristics of the coil device can be satisfactory.

Preferably, a distance between an outer peripheral surface of the columnar portion and an inner peripheral surface of the coil is larger than a distance between the projection and an outer peripheral surface of the coil. In this case, a first gap is formed between the outer peripheral surface of the columnar portion and the inner peripheral surface of the coil and a second gap is formed between the projection and the outer peripheral surface of the coil. In a case where the coil is disposed so as to be positionally deviated within the range of the second gap with respect to the terminal, a gap corresponding in width to the difference between the first and second gaps is formed between the outer peripheral surface of the columnar portion and the inner peripheral surface of the coil. Accordingly, even if the coil is disposed so as to be positionally deviated within the range of the second gap with respect to the terminal, a gap is still formed between the outer peripheral surface of the columnar portion and the inner peripheral surface of the coil and the coil can be inserted into the columnar portion without a problem such as contact of the columnar portion with the inner peripheral surface of the coil.

Preferably, the terminal comprises a pair of the terminals, and the projection of one of the terminals and the projection of the other terminal are disposed between a pair of end portions of the coreless coil. With such a configuration, the positions of the winding part of the coil and the end portions can be regulated by the projection and a positional deviation of the coil with respect to the terminal can be effectively prevented.

Preferably, terminal comprise a pair of the terminals, and a distance between the projection formed on one end side of one of the terminals and the projection formed on one end side of the other terminal is smaller than an outer diameter of the coil. With such a configuration, a positional deviation of the coil to one end side of the terminal and a positional deviation of the coil in the direction perpendicular thereto can be prevented.

Preferably, the projection functions as a connecting wire portion of the terminal. With such a configuration, a positional deviation of the coil with respect to the terminal can be prevented by the projection while the end portion of the coil is connected to the terminal (projection).

In order to achieve the above object, a coil device according to a second aspect of the present invention includes:

a coil made by winding a flat wire flatwise;

a terminal having a connecting wire portion provided with a holding surface holding an end portion of the coil; and a core covering the connecting wire portion together with the coil, in which the holding surface extends in parallel to a winding axis of the coil.

In the coil device according to the present invention, the holding surface of the terminal extends in parallel to the winding axis of the coil. In the coil formed by winding a flat wire flatwise, the long-side surface of the end portion also extends in parallel to the winding axis. Accordingly, the directions of the long-side surface and the holding surface of the connecting wire portion can be aligned, even without the end portion being twisted, when the end portion is pulled out from the winding part of the coil. Accordingly, the end portion of the coil can be held by the holding surface without being twisted, unevenness in the inductance characteristics of the coil device can be prevented, and the highly reliable coil device can be realized.

Preferably, the holding surface faces a side surface of the core. With such a configuration, laser irradiation can be easily performed from the side of the coil device in a case where, for example, laser welding is performed on the connecting wire portion (holding surface) and the manufacturing can be facilitated.

Preferably, the end portion of the coil is bent in a substantially L shape. With such a configuration, the long-side surface of the end portion of the coil is capable of facing the side surface of the core with ease. Accordingly, when the end portion of the coil is held by the holding surface of the connecting wire portion, the holding surface is disposed so as to face the side surface of the core and the laser irradiation is easily performed from the side of the coil device.

Preferably, the connecting wire portion is disposed outside a virtual line parallel to a side surface of the core and in contact with an outer periphery of the coil. With such a configuration, the connecting wire portion can be disposed at a position sufficiently separated from the coil. Accordingly, in a case where laser welding is performed on the connecting wire portion, the laser irradiating the winding part of the coil in part can be prevented and damage to the winding part of the coil can be reduced. In addition, the laser irradiating the core in part can be prevented and damage to the core can also be reduced.

Preferably, the connecting wire portion and a remaining part of the terminal excluding the connecting wire portion are disposed so as to be positionally deviated when viewed from a direction perpendicular to a side surface of the core. With such a configuration, the connecting wire portion can be disposed at a position sufficiently separated from the coil toward the direction parallel to the side surface of the core and the effect described above can be obtained in a case where laser welding is performed on the connecting wire portion.

Preferably, the terminal has a fixed portion disposed in the core and an opening is formed in the fixed portion. With such a configuration, the material forming the core enters the opening and the terminal can be fixed to the core with sufficient fixing strength.

Preferably, the core contains magnetic particles and a resin binder. With such a configuration, the coil device having satisfactory inductance characteristics can be realized.

Preferably, the terminal comprises a pair of the terminals, and the holding surface of one of the terminals and the holding surface of the other terminal are oriented in the same direction. With such a configuration, laser irradiation can be easily performed on the connecting wire portion (holding surface) in a case where, for example, laser welding is performed on the connecting wire portion (holding surface) of each terminal and the manufacturing can be facilitated.

Preferably, the terminal comprises a pair of the terminals, and the connecting wire portion of one of the terminals and the connecting wire portion of the other terminal are disposed diagonally with the coil interposed therebetween. With such a configuration, any end portion of the coil can be held by the terminal disposed so as to face the side surface of the core in a state where the end portion is pulled out straight without being bent in a substantially L shape. Accordingly, laser irradiation can be easily performed on the terminal from the side of the coil device.

DETAILED DESCRIPTION OF THE PREFERRED EMBODIMENTS

Figure 1:
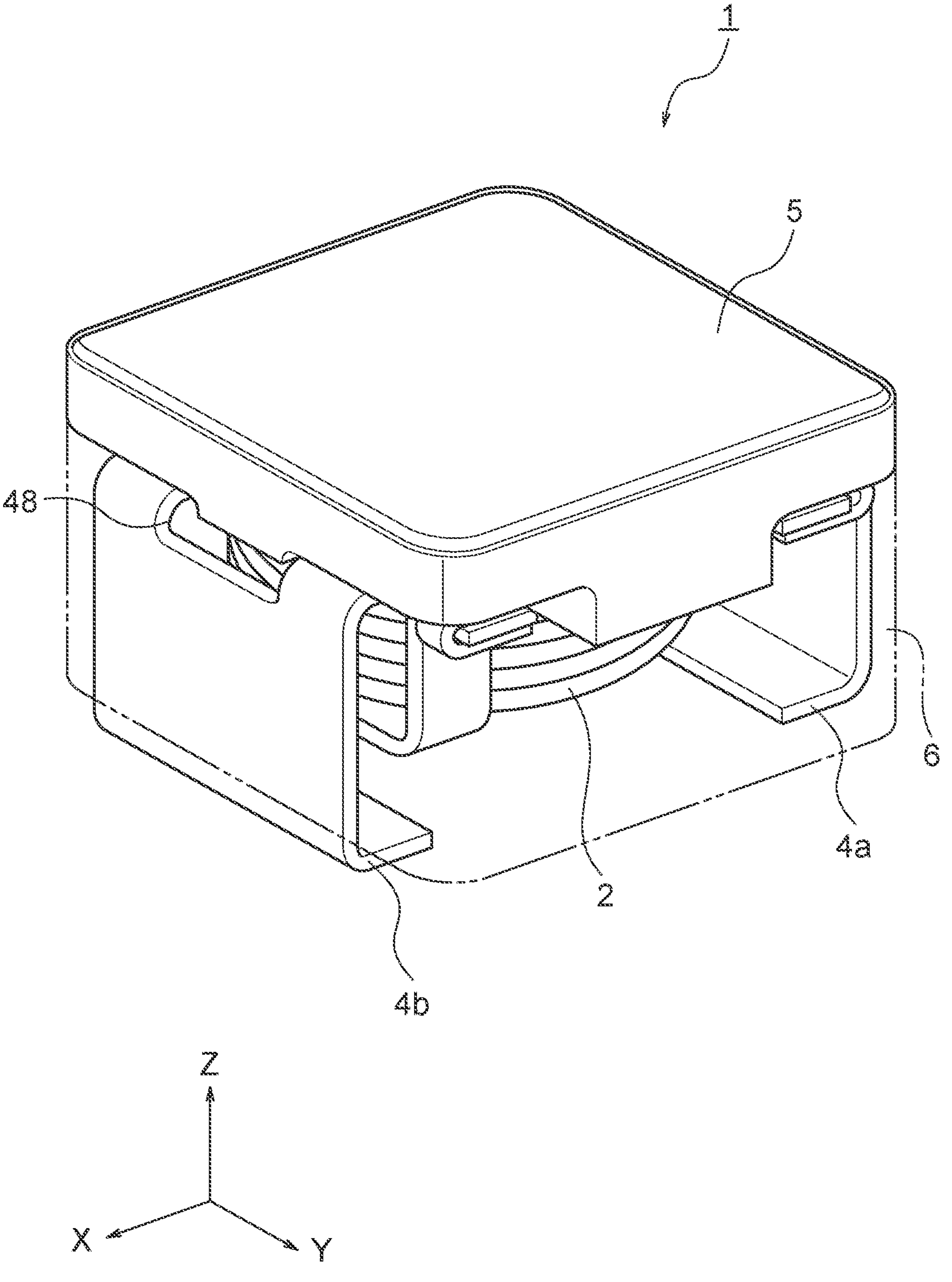
FIG. 1 is a perspective view of a coil device according to a first embodiment of the present invention.

Hereinafter, the present invention will be described based on the embodiments illustrated in the drawings.

As illustrated in FIG. 1, an inductor 1 according to an embodiment of the present invention has a substantially rectangular parallelepiped shape and has a coil 2, terminals 4*a* and 4*b*, a first core 5, and a second core 6. The inductor 1 has a shape in which the first core 5 and the second core 6 are combined in the Z-axis direction. The upper surface of the inductor 1 is formed on the first core 5 side, and the bottom surface (mounting surface) of the inductor 1 is formed on the second core 6 side. It should be noted that the second core 6 is illustrated by a virtual line for easy understanding of the internal configuration of the inductor 1. In addition, in FIGS. 2 to 6D, each of the above configurations is illustrated upside down for easy understanding.

Although the dimensions of the inductor 1 are not particularly limited, its width in the X-axis direction is preferably 2 to 20 mm, its width in the Y-axis direction is preferably 2 to 20 mm, and its width in the Z-axis direction is preferably 1 to 10 mm.

Figure 2:
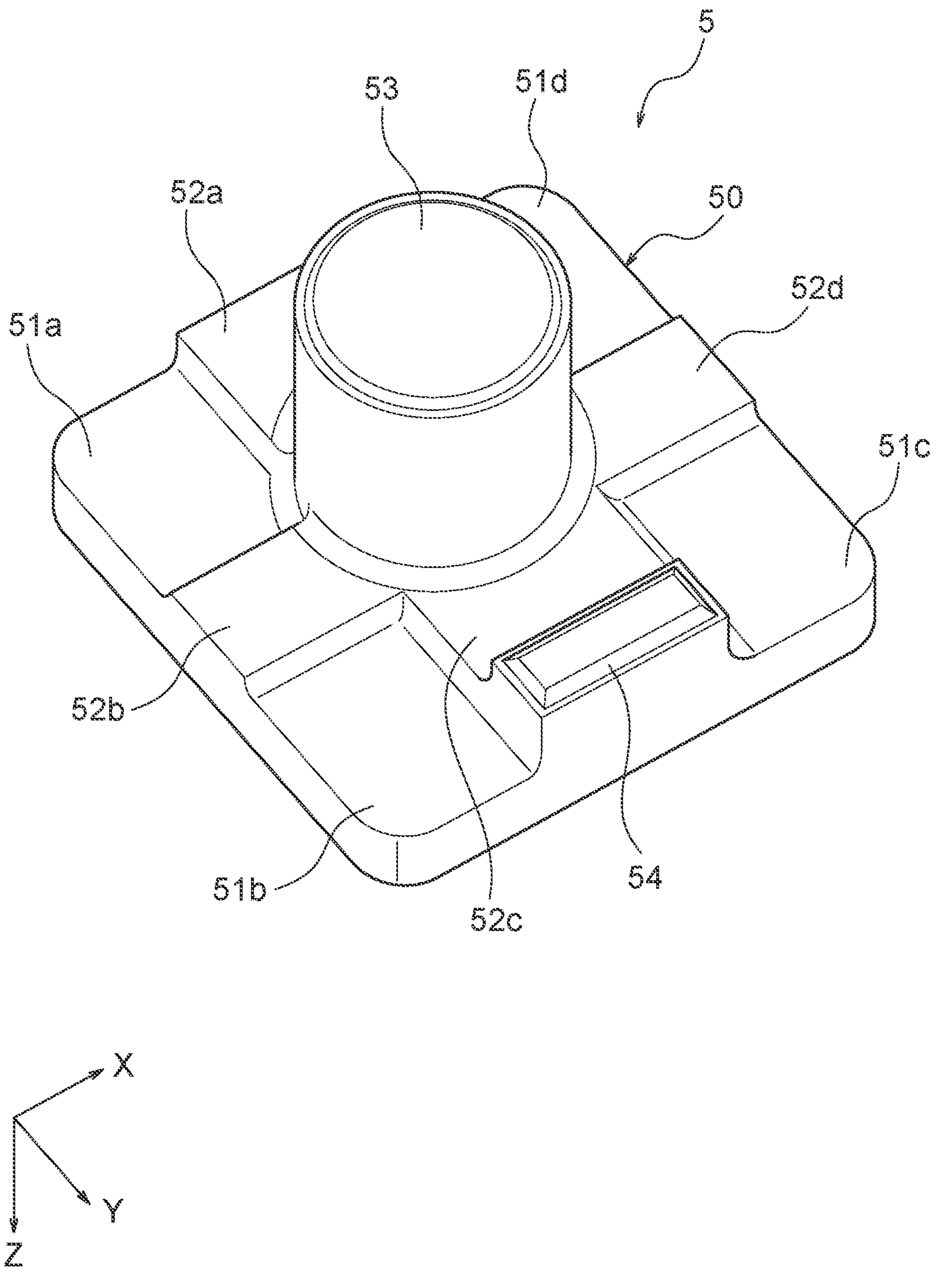
FIG. 2 is a perspective view of a first core illustrated in FIG. 1.

As illustrated in FIG. 2, the first core 5 has a base portion 50 and a columnar portion 53 formed on the surface (upper surface) of the base portion 50. It should be noted that the upper surface of the base portion 50 faces the lower part of the inductor 1 when the inductor 1 is disposed such that the mounting surface faces downward as illustrated in FIG. 1.

The first core 5 is made of a synthetic resin in which ferrite particles or metal magnetic material particles are dispersed. However, the material constituting the first core 5 is not limited thereto and the first core 5 may be made of a synthetic resin that does not contain the particles. Examples of the ferrite particles include Ni—Zn-based ferrite and Mn—Zn-based ferrite. Although the metal magnetic material particles are not particularly limited, examples thereof include Fe—Ni alloy powder, Fe—Si alloy powder, Fe—Si—Cr alloy powder, Fe—Co alloy powder, Fe—Si—Al alloy powder, and amorphous iron.

Although the synthetic resin contained in the first core 5 is not particularly limited, preferable examples thereof include epoxy resin, phenol resin, polyester resin, polyurethane resin, polyimide resin, and silicone resin.

The base portion 50 has a substantially rectangular parallelepiped shape (substantially flat shape). First to fourth recessed portions 51*a* to 51*d*, first to fourth projecting portions 52*a* to 52*d*, and a protruding portion 54 are formed on the surface (upper surface) of the base portion 50. The recessed portions 51*a* to 51*d* are respectively formed at the four corners of the base portion 50 and have a substantially rectangular shape when viewed from the Z-axis direction.

The recessed portions 51*a* to 51*d* have a predetermined depth, and the depth is substantially equal to the thickness (plate thickness) of the terminals 4*a* and 4*b* illustrated in FIG. 1. In other words, the depth of the recessed portions 51*a* to 51*d* is relatively shallow and the upper surface of the base portion 50 is a substantially flat surface. Accordingly, the first core 5 and the second core 6 are joined on substantially the same plane when the first core 5 and the second core 6 are combined as illustrated in FIG. 1.

As illustrated in FIG. 2, the projecting portions 52*a* to 52*d* have a surface shape formed of a flat surface and extend radially outward from the substantially central portion of the base portion 50 (position slightly deviated in terms of position from the center of the base portion 50). The first projecting portion 52*a* is formed between the first recessed portion 51*a* and the fourth recessed portion 51*d*, the second projecting portion 52*b* is formed between the first recessed portion 51*a* and the second recessed portion 51*b*, the third projecting portion 52*c* is formed between the second recessed portion 51*b* and the third recessed portion 51*c*, and the fourth projecting portion 52*d* is formed between the third recessed portion 51*c* and the fourth recessed portion 51*d*.

The protruding portion 54 is formed in the end portion of the third projecting portion 52*c* in the Y-axis direction. The protruding portion 54 protrudes by a predetermined height in the Z-axis direction from the upper surface of the third projecting portion 52*c*. The width of the protruding portion 54 in the X-axis direction is substantially equal to the width of the third projecting portion 52*c* in the X-axis direction. The protruding portion 54 has a substantially rectangular shape when viewed from the Z-axis direction, and a tapered surface is formed on the upper surface thereof.

As will be described later, the terminal 4*a* is disposed in the first recessed portion 51*a* and the second recessed portion 51*b* so as to straddle the second projecting portion 52*b* (see FIG. 5A). The terminal 4*b* is disposed in the third recessed portion 51*c* and the fourth recessed portion 51*d* so as to straddle the fourth projecting portion 52*d* (see FIG. 5A). The projecting portions 52*a* to 52*d* protrude in the Z-axis direction by the thickness of the terminals 4*a* and 4*b* with respect to the recessed portions 51*a* to 51*d*. Accordingly, when the terminals 4*a* and 4*b* are disposed in the recessed portions 51*a* to 51*d* as described above, the upper surface of the projecting portions 52*a* to 52*d* and the upper surface of the terminals 4*a* and 4*b* (a first placement portion 41 and a second placement portion 42) are substantially flush with each other.

The columnar portion 53 is integrally formed in the substantially central portion of the base portion 50 and extends in the Z-axis direction. The columnar portion 53 is formed so as to be positionally deviated slightly to the outside (negative direction side in the Y-axis direction) with respect to the central portion of the base portion 50. The coil (coreless coil) 2 illustrated in FIG. 1 is disposed (inserted or wound) in the columnar portion 53. Accordingly, the diameter of the columnar portion 53 is smaller than the inner diameter of the coil 2. The columnar portion 53 has a columnar shape, and its height is higher than the height of the coil 2 (see FIG. 5A). By the first core 5 being provided with the columnar portion 53, the effective magnetic permeability of the first core 5 in the region inside the coil 2 can be sufficiently ensured and the inductance characteristics of the inductor 1 can be satisfactory.

Figure 3:
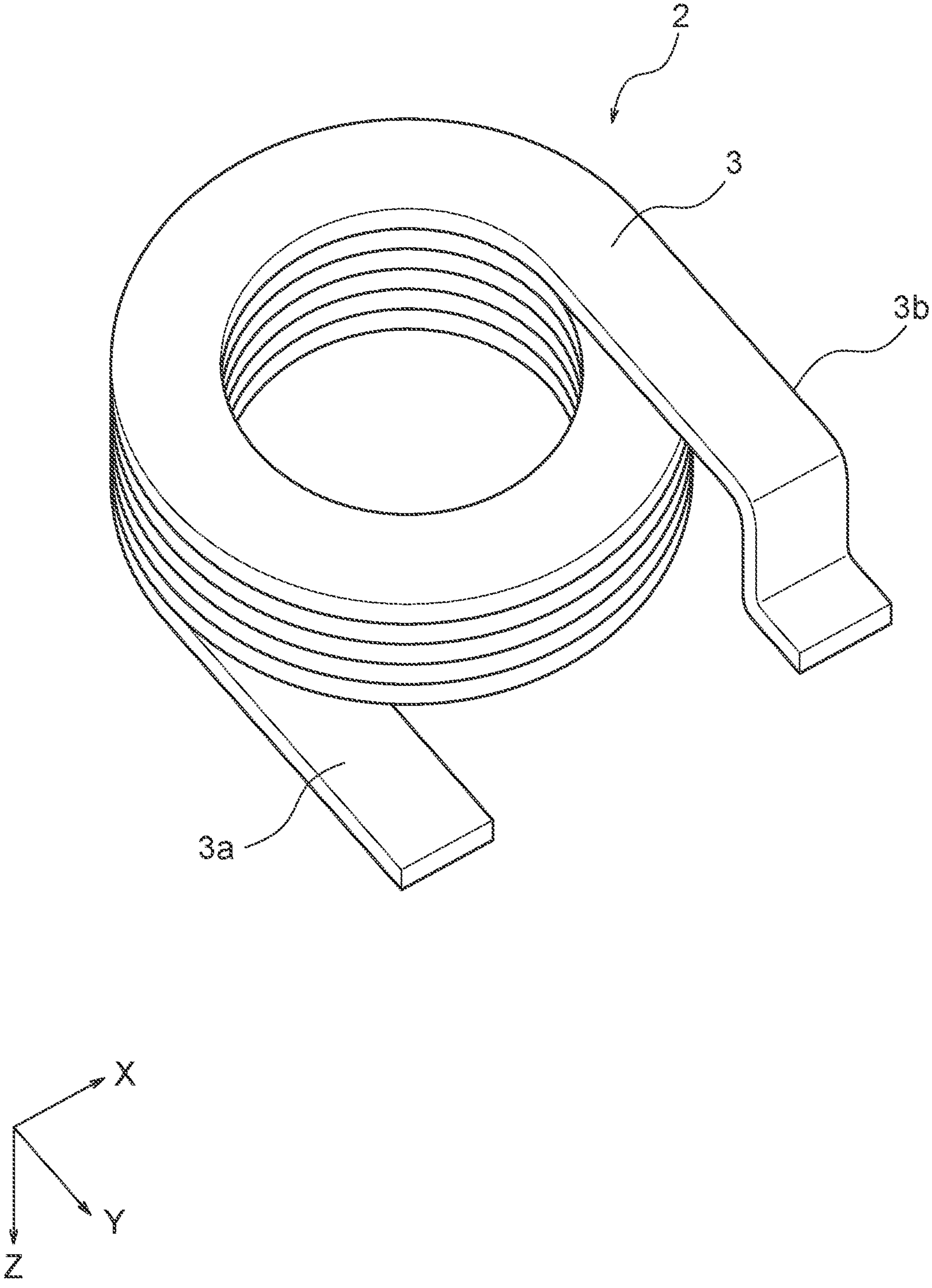
FIG. 3 is a perspective view of a coil illustrated in FIG. 1.

As illustrated in FIG. 3, a coreless coil constitutes the coil 2 in which a wire 3 made of a flat wire is wound edgewise. Although the coil 2 is a-wound, the winding method is not limited thereto. The short-side surface (edge-side surface) of the wire 3 constitutes the inner peripheral surface or the outer peripheral surface of the coil 2, and the long-side surface (width-direction surface) of the wire 3 faces the Z-axis direction.

Although examples of the material constituting the wire 3 include good conductors of metals such as copper, a copper alloy, silver, and nickel, the material is not particularly limited insofar as it is a conductor material. The surface of the wire 3 is provided with an insulating coating. Although the resin constituting the insulating coating is not particularly limited, an epoxy modified acrylic resin or the like is used.

One end of the wire 3 (a wire end 3*a*) constitutes one end portion of the coil 2, and the other end of the wire 3 (a wire end 3*b*) constitutes the other end portion of the coil 2. The wire end 3*a* is linearly pulled out along the Y-axis direction from the lower end of the coil 2 (winding part of the coil 2). The wire end 3*b* is pulled out along the Y-axis direction from the upper end of the coil 2 (winding part of the coil 2) and is pulled out downward along the Z-axis direction. In other words, the wire end 3*b* is pulled out while bending from the Y-axis direction to the Z-axis direction and from the Z-axis direction to the Y-axis direction. Both the wire ends 3*a* and 3*b* are pulled out in the same direction (Y-axis direction) without being twisted.

Figure 4:
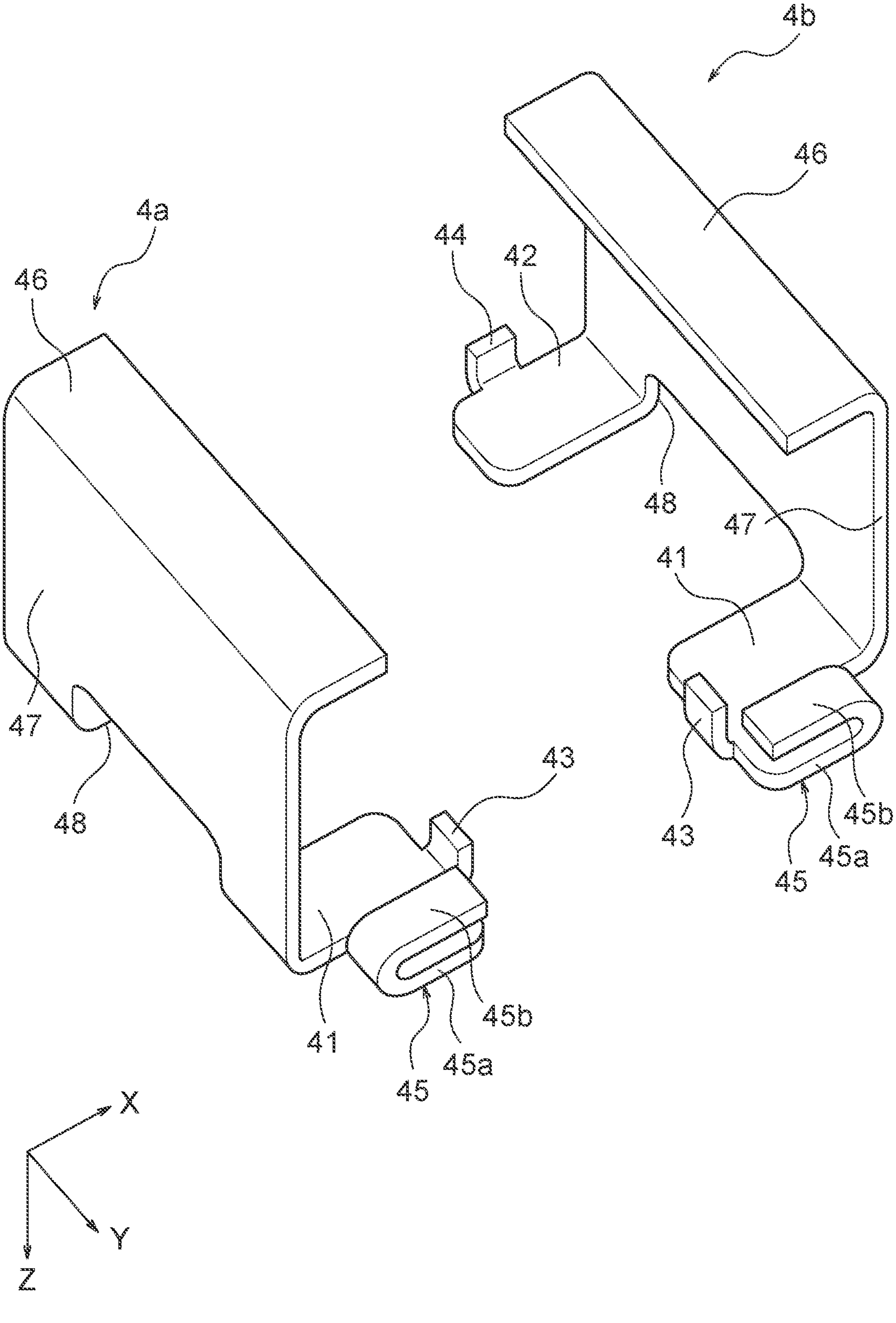
FIG. 4 is a perspective view of a terminal illustrated in FIG. 1.

As illustrated in FIG. 4, the terminals 4*a* and 4*b* are formed so as to be mirror-symmetrical with respect to the YZ plane. As illustrated in FIG. 5A, the terminals 4*a* and 4*b* are disposed (placed) on the upper surface of the base portion 50 at a predetermined interval in the X-axis direction. The terminal 4*a* is disposed on one side of the base portion 50 in the X-axis direction, and the terminal 4*b* is disposed on the other side of the base portion 50 in the X-axis direction. Although the terminals 4*a* and 4*b* are formed by machining a metal plate material or the like, methods for forming the terminals 4*a* and 4*b* are not limited thereto.

As illustrated in FIG. 4, the terminals 4*a* and 4*b* have the first placement portion 41, the second placement portion 42, a first positioning portion 43, a second positioning portion 44, a connecting wire portion 45, a mounting portion 46, a connecting portion 47, and a notch portion 48.

The mounting portion 46 is fixed to the bottom surface of the second core 6 illustrated in FIG. 1. The mounting portion 46 has a predetermined width in the Y-axis direction and is fixed to the region from one end portion to the other end portion of the bottom surface of the second core 6 in the Y-axis direction. In addition, the mounting portion 46 has a predetermined width in the X-axis direction and is fixed to the end portion of the bottom surface of the second core 6 in the X-axis direction. The mounting portion 46 is connected to a circuit board (not illustrated) by solder, a conductive adhesive, or the like.

The connecting portion 47 is integrally connected to the mounting portion 46 and extends in a direction substantially perpendicular to the mounting portion 46. The connecting portion 47 is the part where the mounting portion 46 and the placement portions 41 and 42 are connected and is fixed to the outside surface of the second core 6 illustrated in FIG. 1. The connecting portion 47 extends along the outside surface of the second core 6 toward the side opposite to the first core 5 (Z-axis negative direction side). The connecting portion 47 of the terminal 4*a* and the connecting portion 47 of the terminal 4*b* are disposed so as to face each other in the X-axis direction. When the mounting portion 46 is connected to the circuit board (not illustrated) with solder, a solder fillet is formed at a part of the connecting portion 47. In other words, the connecting portion 47 also functions as a solder fillet forming portion.

The first placement portion 41 and the second placement portion 42 are integrally connected to the end portion of the connecting portion 47 in the Z-axis direction and extend in a direction substantially perpendicular to the connecting portion 47 (the same direction as the extension direction of the mounting portion 46: X-axis direction). The placement portions 41 and 42 have a surface substantially parallel to the upper surface of the first core 5 (base portion 50) and face the mounting portion 46 in the Z-axis direction. The placement portions 41 and 42 are placed on the upper surface of the base portion 50 (see FIG. 5A) and sandwiched between the first core 5 and the second core 6 (see FIG. 1).

The placement portions 41 and 42 disposed on the base portion 50 are covered with the first core 5 (base portion 50) and the second core 6, and thus the terminals 4*a* and 4*b* can be fixed to the cores 5 and 6 via the placement portions 41 and 42. In other words, the placement portions 41 and 42 function as fixing portions for fixing the terminals 4*a* and 4*b* to the cores 5 and 6.

More specifically, as illustrated in FIGS. 2 and 4, the first placement portion 41 of the terminal 4*a* is disposed in the third recessed portion 51*c*, the second placement portion 42 of the terminal 4*a* is disposed in the fourth recessed portion 51*d*, the first placement portion 41 of the terminal 4*b* is disposed in the second recessed portion 51*b*, and the second placement portion 42 of the terminal 4*b* is disposed in the first recessed portion 51*a*.

As illustrated in FIG. 4, the first placement portion 41 is formed in the end portion on one side of the terminals 4*a* and 4*b* in the Y-axis direction and the second placement portion 42 is formed in the end portion on the other side of the terminals 4*a* and 4*b* in the Y-axis direction. The first placement portion 41 and the second placement portion 42 are disposed at a predetermined interval in the Y-axis direction, and the notch portion 48 separating the placement portions 41 and 42 is formed between the placement portions 41 and 42. As illustrated in FIG. 1, the notch portion 48 is formed at a position where at least the terminals 4*a* and 4*b* are exposed to the outside of the first core 5 and the second core 6. In the example illustrated in FIG. 4, the notch portion 48 reaches the lower end portion of the connecting portion 47 from the tip portions of the placement portions 41 and 42. By the terminals 4*a* and 4*b* being provided with the notch portion 48, the terminals 4*a* and 4*b* are easily folded at the intersection of the placement portions 41 and 42 and the connecting portion 47.

Figure 5A:
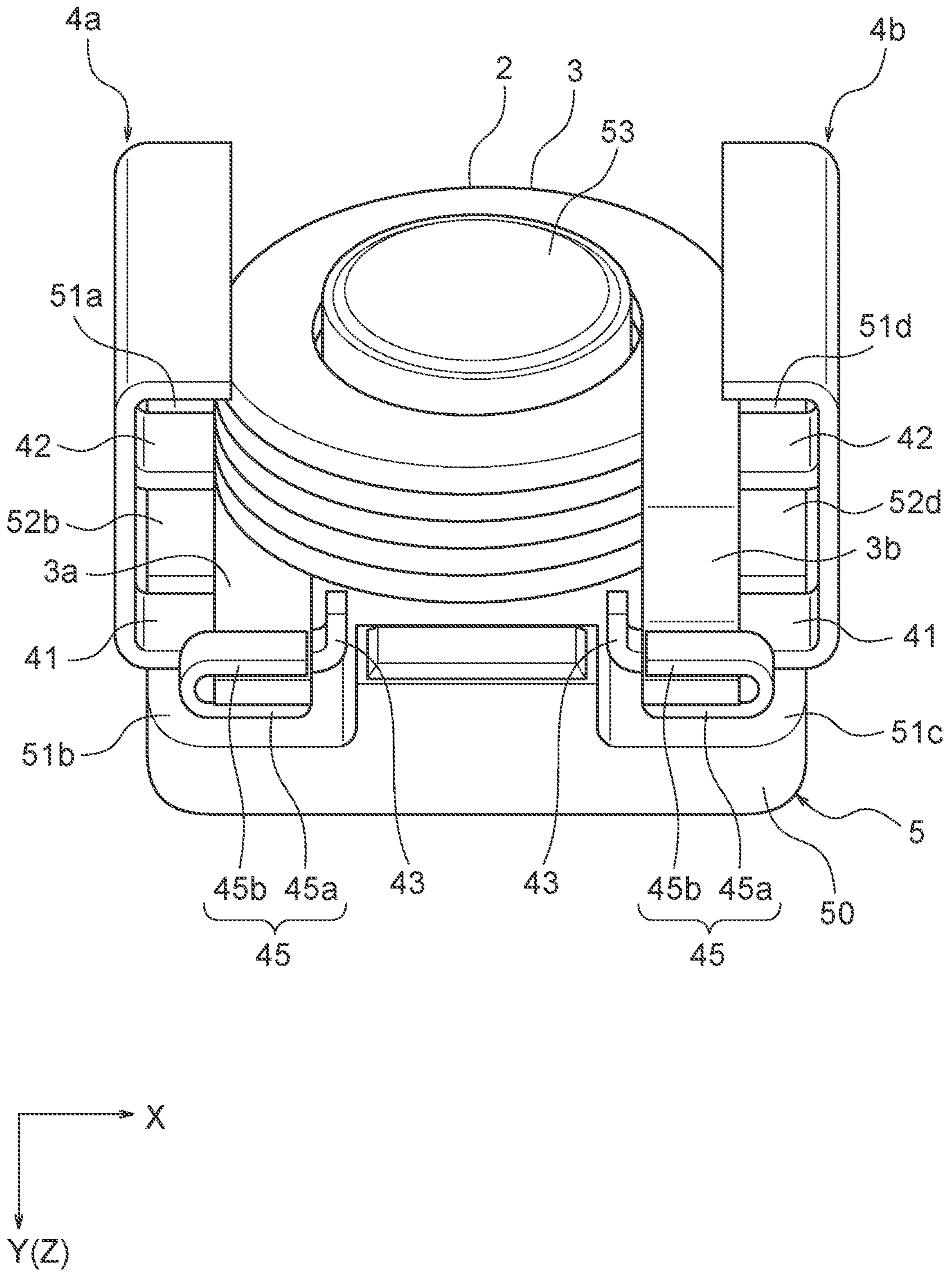
FIG. 5A is a perspective view in which the coil device illustrated in FIG. 1 is viewed from another angle.

When the terminals 4*a* and 4*b* are disposed on the upper surface of the base portion 50 as illustrated in FIG. 5A, the fourth projecting portion 52*d* is disposed in the region where the notch portion 48 of the terminal 4*a* is formed and the second projecting portion 52*b* is disposed in the region where the notch portion 48 of the terminal 4*b* is formed.

As illustrated in FIG. 4, the connecting wire portion 45 is integrally formed in the end portion on one side of the first placement portion 41 in the Y-axis direction. The end portion of the coil 2 illustrated in FIG. 3 is connected to the connecting wire portion 45. The connecting wire portion 45 of the terminal 4*a* and the connecting wire portion 45 of the terminal 4*b* are disposed so as to be oriented in the same direction (Y-axis direction).

The connecting wire portion 45 has a fixed piece 45*a* and a folded piece 45*b*. The fixed piece 45*a* faces the folded piece 45*b* in the Z-axis direction and is integrally formed in the end portion on one side of the first placement portion 41 in the Y-axis direction. The fixed piece 45*a* has a shape in which the first placement portion 41 is extended to one end side in the Y-axis direction. The fixed piece 45*a* is placed on the upper surface of the base portion 50 as in the case of the first placement portion 41 (see FIG. 5A).

The folded piece 45*b* is integrally formed in the end portion on the other side of the fixed piece 45*a* in the X-axis direction and is formed so as to be foldable with the end portion serving as a folding point (fulcrum). The folded piece 45*b* that is yet to be folded is formed so as to stand upright in the Z-axis direction. As illustrated, the folded piece 45*b* that is folded is formed so as to extend to one side in the X-axis direction. The folded piece 45*b* of the terminal 4*a* and the folded piece 45*b* of the terminal 4*b* extend in a direction in which the folded pieces 45*b* approach each other. The folded piece 45*b* is disposed together with the fixed piece 45*a* so as to face the upper surface of the base portion 50.

As illustrated in FIG. 5A, the connecting wire portion 45 of the terminal 4*a* sandwiches and holds the wire end 3*a* of the wire 3 with the fixed piece 45*a* and the folded piece 45*b*. In addition, the connecting wire portion 45 of the terminal 4*b* sandwiches and holds the wire end 3*b* of the wire 3 with the fixed piece 45*a* and the folded piece 45*b*.

As in the case of the placement portions 41 and 42, the connecting wire portion 45 is placed on the surface of the base portion 50. The connecting wire portion 45 is sandwiched between the first core 5 and the second core 6 illustrated in FIG. 1. When the long-side surface of the wire ends 3*a* and 3*b* of the wire 3 is held by the connecting wire portion 45, the holding surface is disposed so as to be substantially parallel to the upper surface of the base portion 50. In addition, the holding surface (abutting surface) of the wire ends 3*a* and 3*b* in the fixed piece 45*a*, the holding surface (abutting surface) of the wire ends 3*a* and 3*b* in the folded piece 45*b*, and the long-side surface of the wire ends 3*a* and 3*b* are disposed so as to be substantially parallel.

As illustrated in FIG. 4, the first positioning portion 43 is formed in the end portion on one side of the first placement portion 41 in the X-axis direction. The first positioning portion 43 is folded with the edge of the first placement portion 41 in the end portion serving as a folding point (fulcrum) and extends in the Z-axis direction. The first positioning portion 43 is formed on the side opposite to the side where the folding point of the folded piece 45*b* is disposed. The first positioning portion 43 of the terminal 4*a* and the first positioning portion 43 of the terminal 4*b* face each other in the X-axis direction.

Figure 5B:
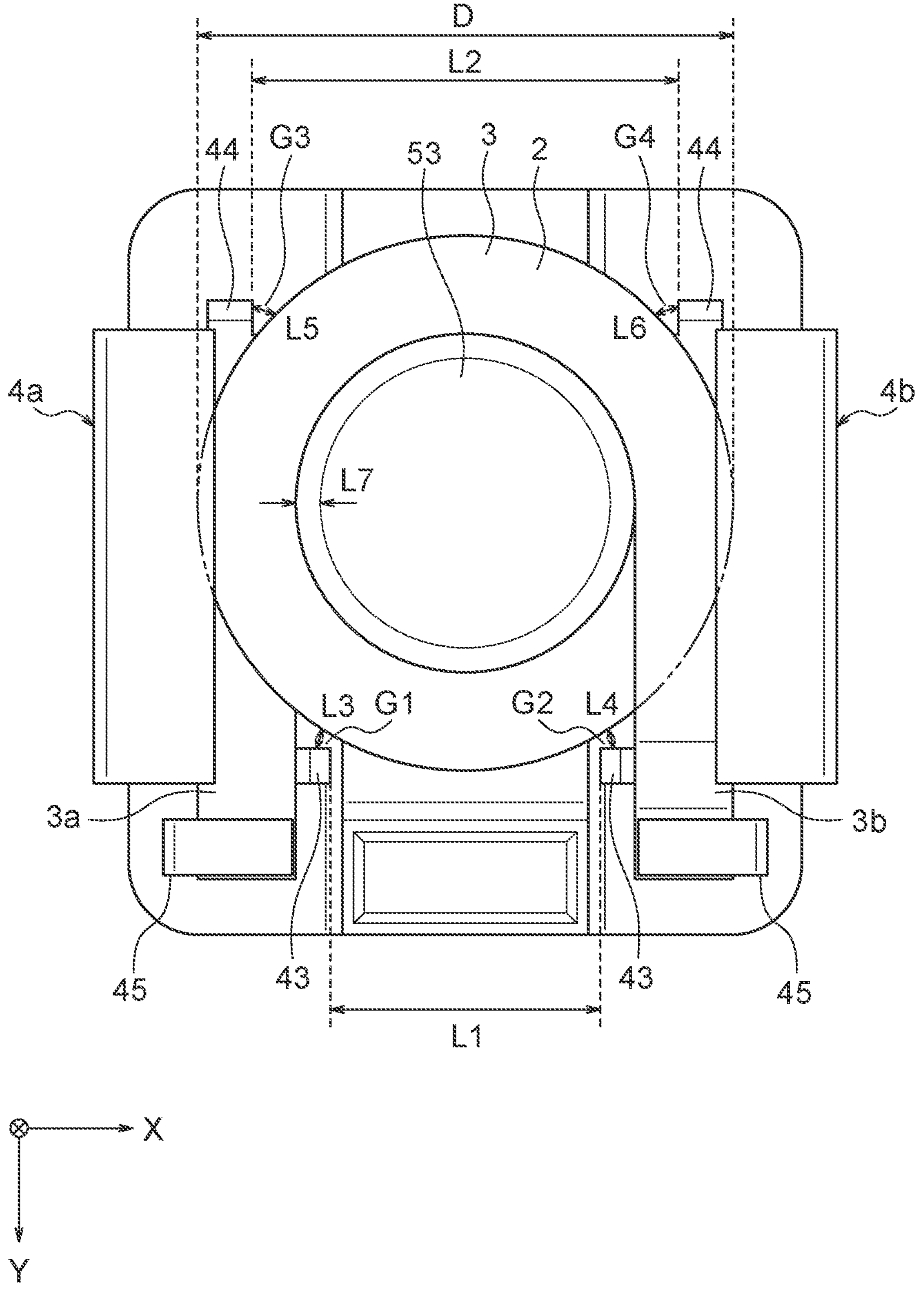
FIG. 5B is a perspective view in which the coil device illustrated in FIG. 5A is viewed from another angle.

As illustrated in FIG. 5B, the first positioning portion 43 of the terminal 4*a* is formed around the wire end 3*a* and the first positioning portion 43 of the terminal 4*b* is formed around the wire end 3*b*. The first positioning portion 43 of the terminal 4*a* and the first positioning portion 43 of the terminal 4*b* are disposed between the pair of end portions (wire ends 3*a* and 3*b*) of the coil 2. More specifically, the first positioning portion 43 of the terminal 4*a* is disposed around the intersection where the wire end 3*a* intersects with the outer peripheral surface of the coil 2 and the first positioning portion 43 of the terminal 4*b* is disposed around the intersection where the wire end 3*b* intersects with the outer peripheral surface of the coil 2.

A distance L1 between the first positioning portion 43 of the terminal 4*a* and the first positioning portion 43 of the terminal 4*b* is smaller than an outer diameter D of the coil 2 (the same applies to a distance L2 described later). In the illustrated example, the distance L1 is substantially equal to the distance between the wire end 3*a* and the wire end 3*b* or the inner diameter of the coil 2.

As illustrated in FIG. 4, the second positioning portion 44 is formed in the end portion on the other side of the second placement portion 42 in the Y-axis direction. The second placement portion 42 is positioned on the side opposite to the connecting wire portion 45 along the Y-axis direction. The second positioning portion 44 is folded with the edge of the second placement portion 42 in the end portion serving as a folding point (fulcrum) and extends in the Z-axis direction. The second positioning portion 44 of the terminal 4*a* and the second positioning portion 44 of the terminal 4*b* face the side surface of the second core 6 illustrated in FIG. 1 (side surface vertically intersecting with the Y axis with the terminals 4*a* and 4*b* not fixed).

Each of the positioning portions 43 and 44 has a projection shape. Although the length of the positioning portions 43 and 44 in the Z-axis direction is not particularly limited, the length is approximately ¼ to ¾ of the longitudinal length of the folded piece 45*b*. In addition, the length of the positioning portions 43 and 44 in the Z-axis direction is preferably ⅛ to ¼ of the height of the coil 2.

As illustrated in FIG. 5B, the first positioning portion 43 of the terminal 4*a* is disposed so as to be positionally deviated inward in the X-axis direction with respect to the second positioning portion 44 of the terminal 4*a* and the first positioning portion 43 of the terminal 4*b* is disposed so as to be positionally deviated inward in the X-axis direction with respect to the second positioning portion 44 of the terminal 4*b*. Accordingly, the distance L1 between the first positioning portion 43 of the terminal 4*a* and the first positioning portion 43 of the terminal 4*b* is smaller than the distance L2 between the second positioning portion 44 of the terminal 4*a* and the second positioning portion 44 of the terminal 4*b*.

When the coil 2 and the terminals 4*a* and 4*b* are disposed on the upper surface of the base portion 50, the positioning portions 43 and 44 of the terminal 4*a* and the positioning portions 43 and 44 of the terminal 4*b* are disposed in the vicinity of the outer periphery of the coil 2. As a result, the position of the coil 2 (movement in the X-axis, Y-axis, and rotation directions) is regulated with respect to the terminals 4*a* and 4*b* and the coil 2 can be positioned with respect to the terminals 4*a* and 4*b*.

In the present embodiment, the positioning portions 43 and 44 do not abut against the outer peripheral surface of the coil 2. More specifically, a gap G1 is formed between the first positioning portion 43 of the terminal 4*a* and the outer peripheral surface of the coil 2, a gap G2 is formed between the first positioning portion 43 of the terminal 4*b* and the outer peripheral surface of the coil 2, a gap G3 is formed between the second positioning portion 44 of the terminal 4*a* and the outer peripheral surface of the coil 2, and a gap G4 is formed between the second positioning portion 44 of the terminal 4*b* and the outer peripheral surface of the coil 2.

L3=L4=L5=L6 may be satisfied and the respective values of L3 to L6 may not be entirely equal in a case where the gap width of the gap G1 is L3, the gap width of the gap G2 is L4, the gap width of the gap G3 is L5, and the gap width of the gap G4 is L6. For example, L3=L4>L5=L6 may be satisfied or L5=L6>L3=L4 may be satisfied.

In a state where the central portion of the columnar portion 53 and the central portion of the coil 2 substantially coincide with each other, a gap width L7 between the outer peripheral surface of the columnar portion 53 and the inner peripheral surface of the coil 2 is larger than the gap widths L3 to L6 of the gaps G1 to G4 described above. More specifically, the gap width L7 is larger than the average value of the gap widths L3 to L6 or larger than the maximum value of the distances L3 to L6.

It should be noted that the folded piece 45*b* of the connecting wire portion 45 that is yet to be folded is raised in the Z-axis direction and the coil 2 (more specifically, the wire ends 3*a* and 3*b* of the wire 3 constituting the end portion of the coil 2) can be positioned in this state. In other words, the folded piece 45*b* of the connecting wire portion 45 of the terminals 4*a* and 4*b* that is yet to be folded also functions as a positioning portion.

With the terminals 4*a* and 4*b* disposed on the upper surface of the base portion 50 as illustrated in FIG. 5A, the coil 2 is disposed (placed) so as to straddle the first placement portion 41 and the second placement portion 42 of the terminal 4*a*, the first placement portion 41 and the second placement portion 42 of the terminal 4*b*, and the first to fourth projecting portions 52*a* to 52*d* of the base portion 50.

In the present embodiment, the connecting wire portion 45 (more accurately, the fixed piece 45*a*) of the terminals 4*a* and 4*b* is disposed on the first core 5 (base portion 50) around the connecting wire portion 45 and the second core 6 illustrated in FIG. 1 is disposed on the connecting wire portion 45 (more accurately, the folded piece 45*b*).

Although there is a step between the disposition position of the connecting wire portion 45 (fixed piece 45*a*) and the disposition position of the coil 2 as described above, the height of the step is approximately equal to the plate thickness of the terminals 4*a* and 4*b* and is relatively small. Accordingly, in substance, the connecting wire portion 45 (fixed piece 45*a*) and the coil 2 are disposed on substantially the same plane of the base portion 50.

As illustrated in FIGS. 1 and 5A, the second core 6 is formed together with the coil 2 so as to cover the upper surface of the base portion 50. The second core 6 is formed by, for example, performing injection molding after inserting a temporary assembly in which the first core 5 is combined with the coil 2 with the terminals 4*a* and 4*b* connected to the respective end portions into a press mold. Alternatively, a pre-molded core (temporarily molded core) may be used as the second core 6. The materials constituting the second core 6 and the first core 5 may be identical in type to each other or different in type from each other. It should be noted that resin may be the only material constituting the second core 6.

When the second core 6 is combined with the first core 5, the second core 6 covers the coil 2 and a part of the terminals 4*a* and 4*b* (placement portions 41 and 42, positioning portions 43 and 44, and connecting wire portion 45).

Figure 6A:
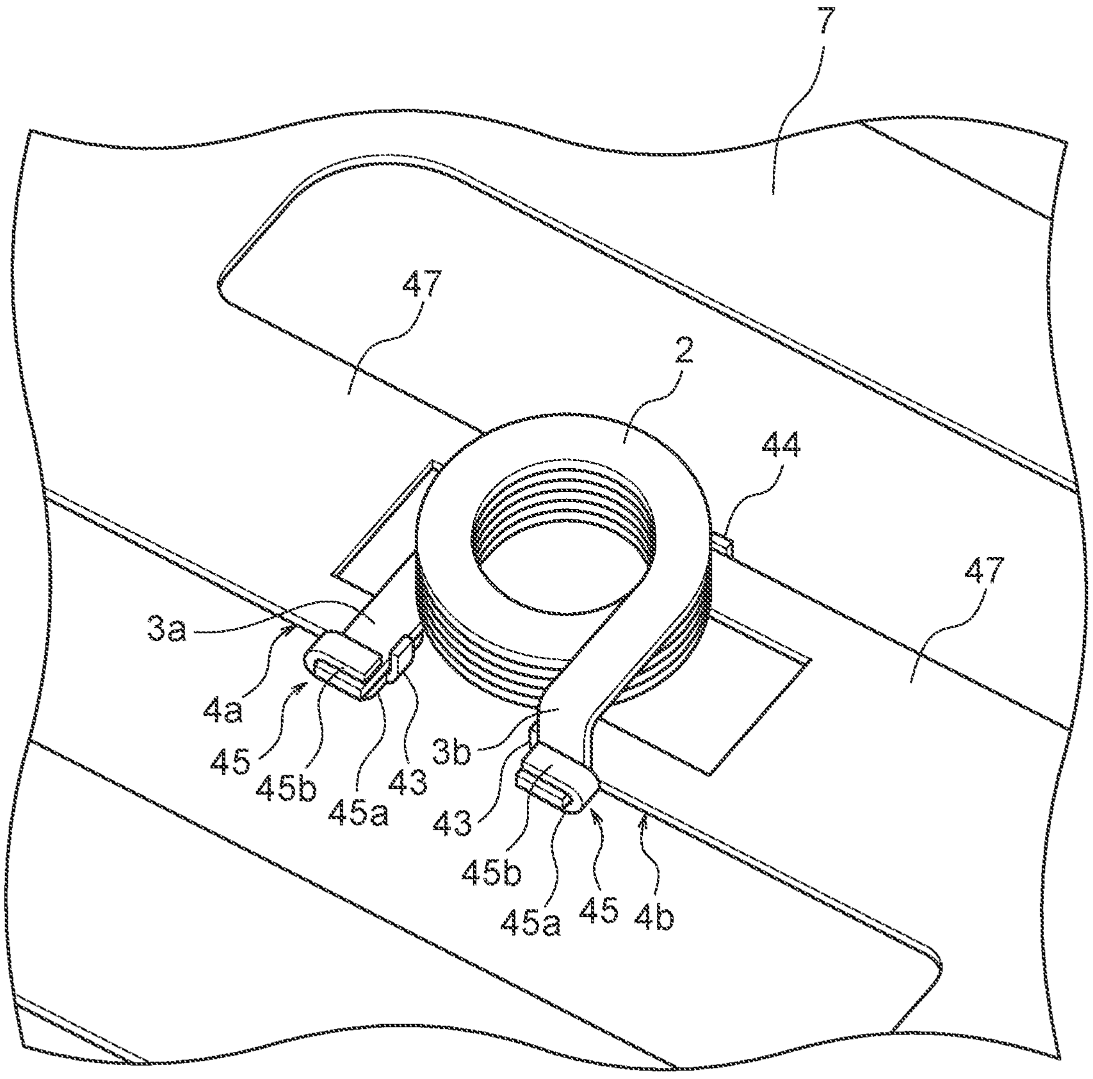
FIG. 6A is a diagram illustrating a method for manufacturing the coil device illustrated in FIG. 1.

Next, a method for manufacturing the inductor 1 will be described with reference to FIGS. 6A to 6E and the like. In the method of the present embodiment, a conductive plate such as a metal plate (such as a Sn-plated metal plate) is punched first into a shape as illustrated in FIG. 6A. As illustrated in FIG. 6A, the terminals 4*a* and 4*b* connected to a frame 7 via the connecting portion 47 are formed on the conductive plate after the punching.

Next, the terminals 4*a* and 4*b* are connected to the respective end portions of the coil 2 illustrated in FIG. 3 (wire ends 3*a* and 3*b* of the wire 3). At this time, a part of the bottom surface of the coil 2 is placed on the placement portions 41 and 42 of the terminals 4*a* and 4*b* while the position of the coil 2 with respect to the terminals 4*a* and 4*b* is regulated by the positioning portions 43 and 44 of the terminals 4*a* and 4*b*. More specifically, as for the outer peripheral surface of the coil 2, a part of the bottom surface of the coil 2 is placed on the placement portions 41 and 42 of the terminals 4*a* and 4*b* such that a predetermined interval is formed inside the positioning portions 43 and 44 of the terminals 4*a* and the positioning portions 43 and 44 of the terminals 4*b*. Then, the wire ends 3*a* and 3*b* are sandwiched (held) between the fixed piece 45*a* and the folded piece 45*b* and the wire ends 3*a* and 3*b* are connected to the connecting wire portion 45.

Figure 6B:
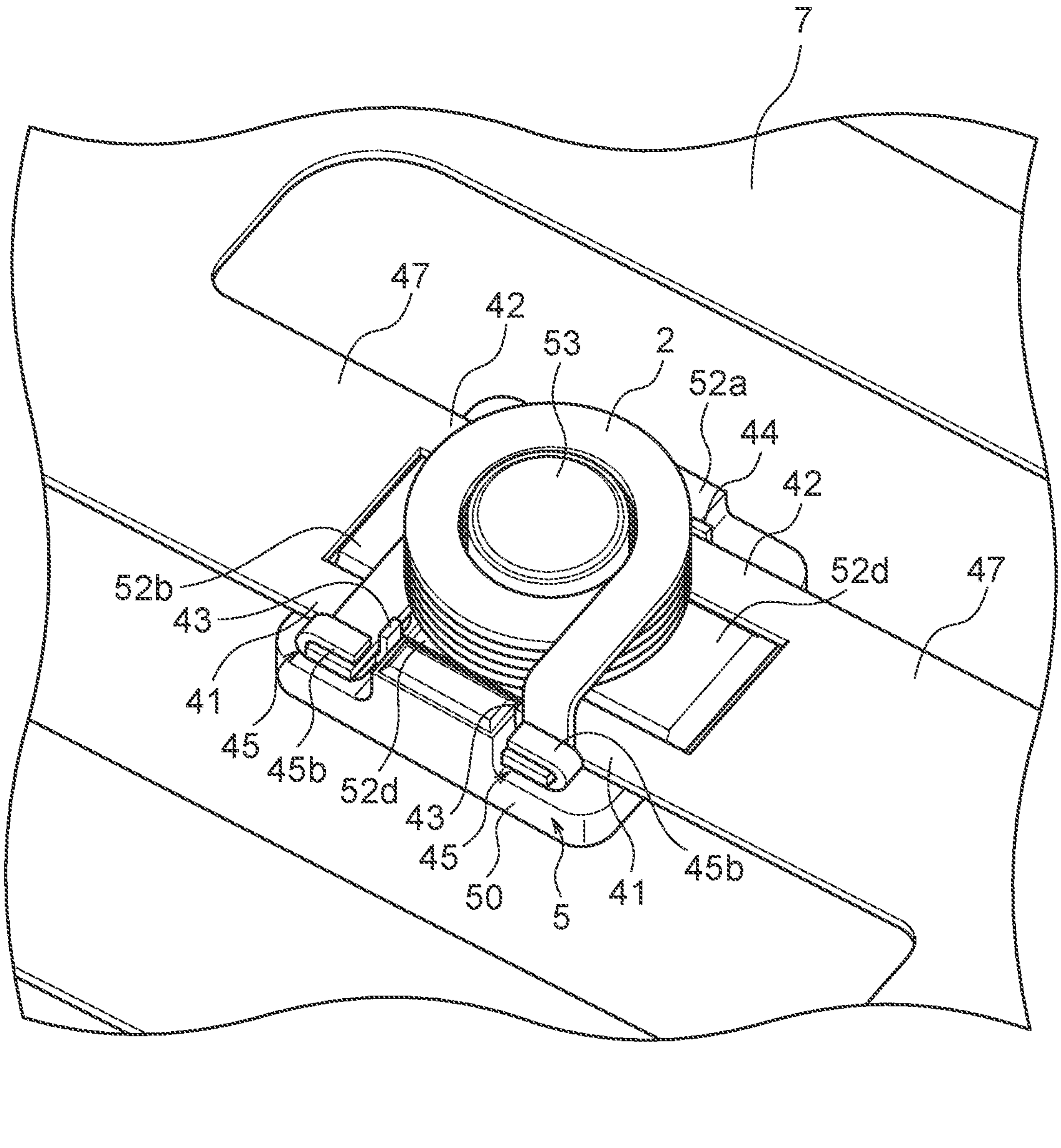
FIG. 6B is a diagram illustrating the process subsequent to FIG. 6A.

Next, as illustrated in FIG. 6B, the first core 5 illustrated in FIG. 2 is combined with the coil 2 with the terminals 4*a* and 4*b* fixed to the respective end portions. The temporary assembly is configured as a result. More specifically, the columnar portion 53 of the first core 5 is inserted inside the coil 2 and the placement portions 41 and 42 of the terminals 4*a* and 4*b* are placed on the upper surface of the base portion 50. At this time, a part of the bottom surface of the coil 2 is placed on the projecting portions 52*a* to 52*d* of the base portion 50. A pre-molded core (temporarily molded core) is used as the first core 5. A fluid material is used and a composite magnetic material using a thermoplastic resin or a thermosetting resin as a binder is used as the material constituting the first core 5.

Laser welding is performed on the connecting wire portion 45 before or after the configuration of the temporary assembly (that is, in the state illustrated in FIG. 6A or FIG. 6B). The laser welding is performed by, for example, performing laser emission toward the folded piece 45*b* from above the connecting wire portion 45. A laser ball (not illustrated) is formed at the part irradiated with the laser.

Next, the temporary assembly illustrated in FIG. 6B is inserted into the press mold and the second core 6 is formed by injection molding in the press mold. At this time, the connecting portion 47 of the terminals 4*a* and 4*b* is exposed from the press mold. During the injection molding, a mixture containing magnetic powder and binder resin is fluidized by heating or the like, injected into the press mold, and solidified by cooling or the like. The second core 6 illustrated in FIG. 6C is obtained as a result.

In the illustrated example, a step portion 60 is formed on the surface of the second core 6 so as to straddle the side and bottom surfaces thereof. The mounting portion 46 (FIG. 4) of the terminals 4*a* and 4*b* can be disposed at a part of the step portion 60 formed on the bottom surface of the second core 6. The connecting portion 47 of the terminals 4*a* and 4*b* can be disposed at a part of the step portion 60 formed on the side surface of the second core 6.

Figure 6C:
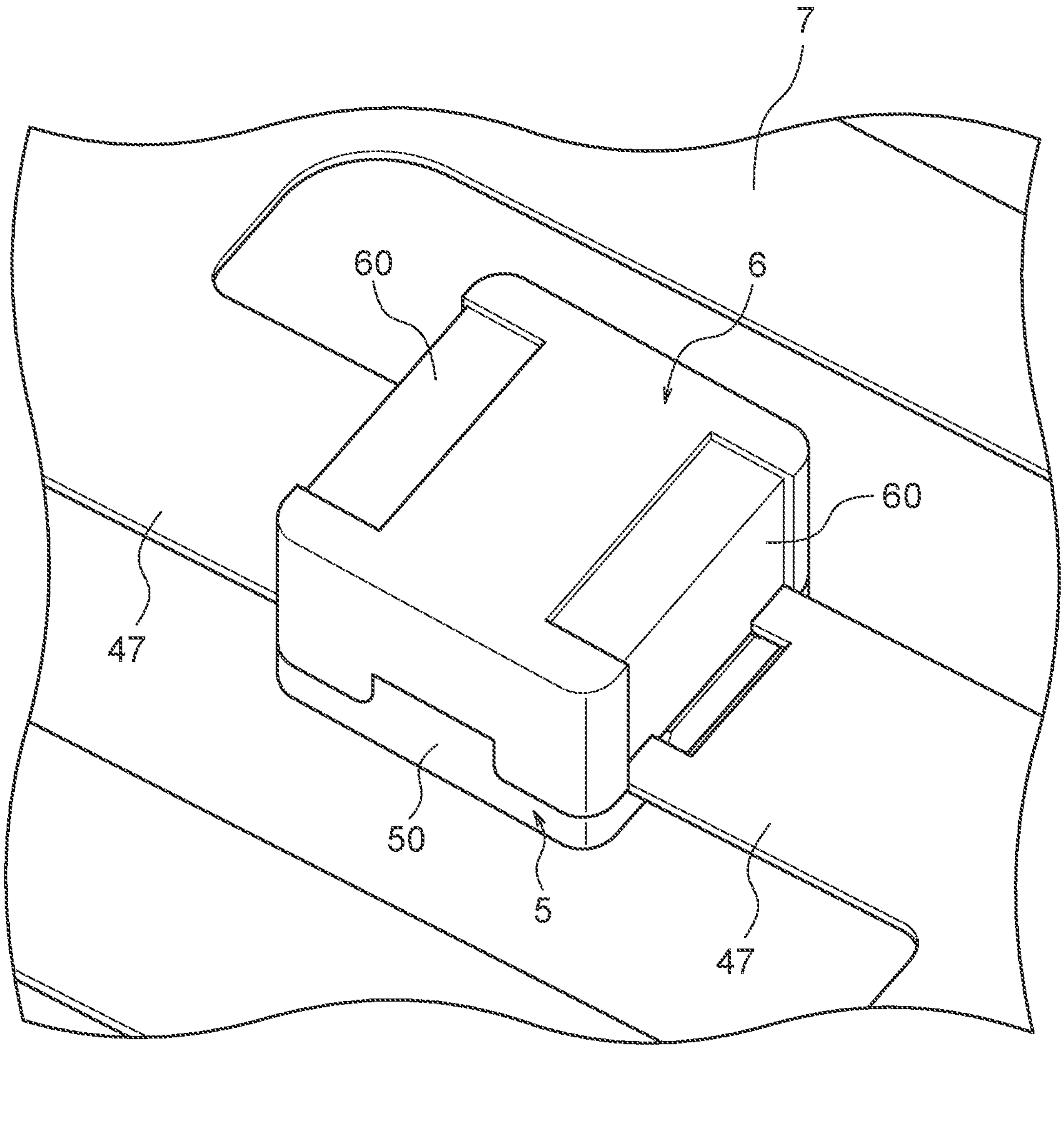
FIG. 6C is a diagram illustrating the process subsequent to FIG. 6B.
Figure 6D:
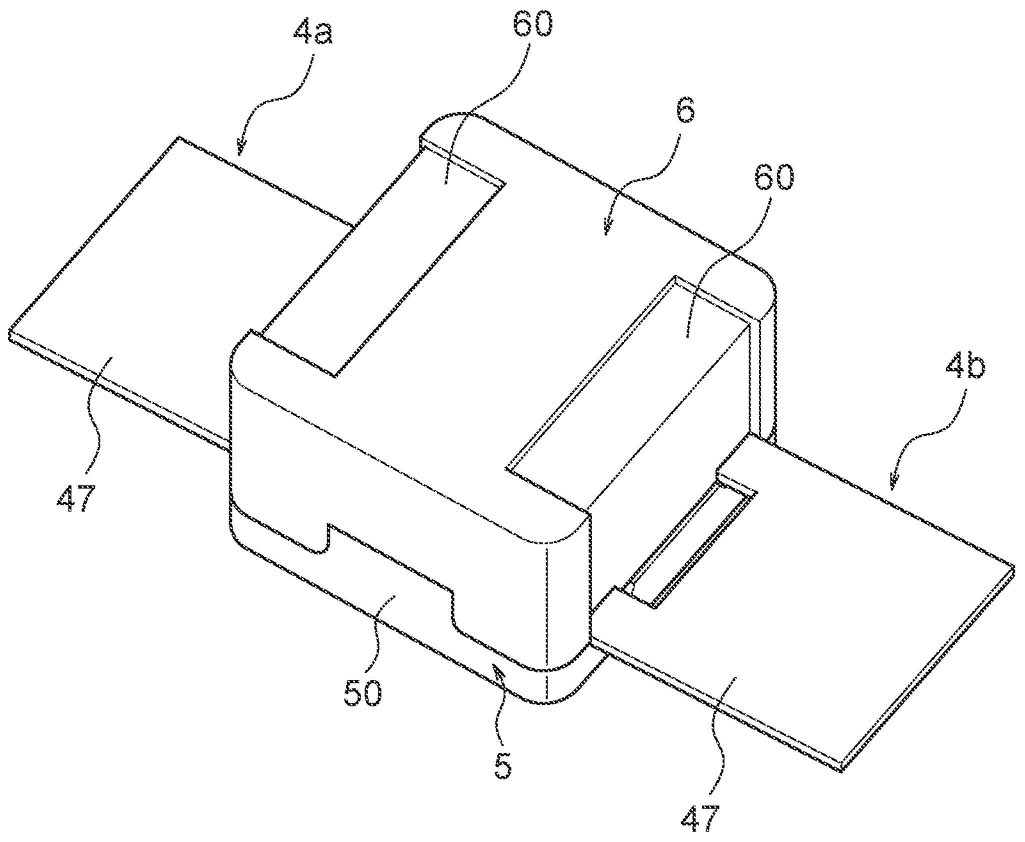
FIG. 6D is a diagram illustrating the process subsequent to FIG. 6C.
Figure 6E:
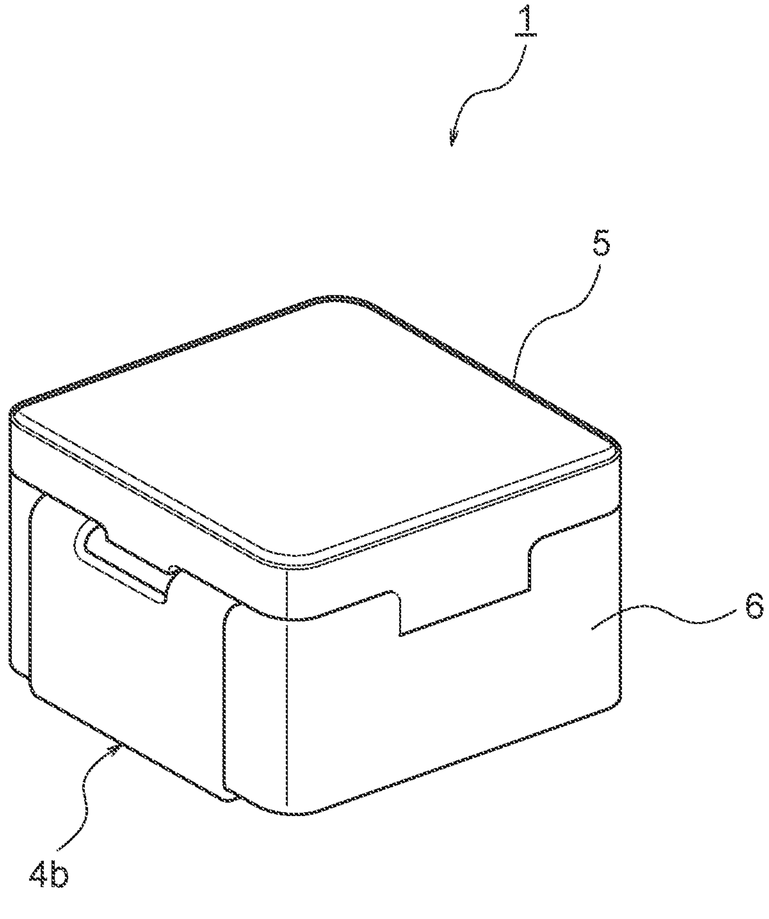
FIG. 6E is a diagram illustrating the process subsequent to FIG. 6D.

Next, as illustrated in FIG. 6D, the frame 7 illustrated in FIG. 6C is cut with a cutting tool and removed. As illustrated in FIG. 6E, the part left after the removal (connecting portion 47) is fixed to the step portion 60. More specifically, as illustrated in FIG. 6E, the connecting portion 47 of the terminals 4*a* and 4*b* is folded substantially vertically from the state illustrated in FIG. 6D and the connecting portion 47 is fixed to a part of the step portion 60 formed on the side surface of the second core 6. In addition, in that state, the tip portion of the connecting portion 47 is folded substantially vertically and fixed to a part of the step portion 60 formed on the bottom surface of the second core 6. The inductor 1 according to the present embodiment can be obtained in this manner.

In the inductor 1 according to the present embodiment, projections (the first positioning portion 43 and the second positioning portion 44) regulating the position of the coil 2 are formed on the terminals 4*a* and 4*b*. Accordingly, when the end portions (wire ends 3*a* and 3*b*) of the coil 2 are connected to the terminals 4*a* and 4*b*, the position of the coil 2 with respect to the terminals 4*a* and 4*b* is regulated by the positioning portions 43 and 44 and a positional deviation of the coil 2 with respect to the terminals 4*a* and 4*b* can be prevented. Further, when the terminals 4*a* and 4*b* are disposed at predetermined positions of the first core 5 together with the coil 2 in this state, the coil 2 is smoothly inserted into the columnar portion (winding core portion) 53 of the first core 5 and a problem such as contact of the columnar portion 53 with the inner peripheral surface of the coil 2 can be prevented. As a result, according to the present embodiment, unevenness between products in inductance characteristics attributable to the problem can be prevented and the highly reliable inductor 1 can be realized. In addition, the manufacturing of the inductor 1 can be facilitated by such a problem being prevented.

In addition, in the present embodiment, the positioning portions 43 and 44 are disposed in the vicinity of the outer periphery of the coil 2. Accordingly, the deviation width of the position of the coil 2 with respect to the terminals 4*a* and 4*b* can be reduced and a positional deviation of the coil 2 with respect to the terminals 4*a* and 4*b* can be effectively prevented.

In addition, in the present embodiment, the positioning portions 43 and 44 do not abut against the outer peripheral surface of the coil 2. Accordingly, in a case where an insulating film is formed on the outer surface of the coil 2, damage to the insulating film attributable to friction with the positioning portions 43 and 44 can be prevented and short circuit failure is unlikely to occur between the terminals 4*a* and 4*b* and the coil 2 (outer peripheral surface of the coil 2).

In addition, in the present embodiment, the first core 5 has the columnar portion 53 into which the coil 2 is inserted. Accordingly, the effective magnetic permeability of the first core 5 in the region inside the coil 2 can be sufficiently ensured and the inductance characteristics of the inductor 1 can be satisfactory.

In addition, in the present embodiment, the distance L7 between the outer peripheral surface of the columnar portion 53 and the inner peripheral surface of the coil 2 is larger than the distances L3 to L6 between the positioning portions 43 and 44 and the outer peripheral surface of the coil 2 as illustrated in FIG. 5B. In this case, a first gap is formed between the outer peripheral surface of the columnar portion 53 and the inner peripheral surface of the coil 2 and second gaps (the gaps G1 to G4) are formed between the positioning portions 43 and 44 and the outer peripheral surface of the coil 2. In a case where the coil 2 is disposed so as to be positionally deviated within the range of the gap G1 with respect to the terminals 4*a* and 4*b*, a gap corresponding in width to the difference between the first and second gaps (that is, a gap having a width of L7-L3 to L7+L3) is formed between the outer peripheral surface of the columnar portion 53 and the inner peripheral surface of the coil 2. Accordingly, even if the coil 2 is disposed so as to be positionally deviated within the range of the second gap with respect to the terminals 4*a* and 4*b*, a gap is still formed between the outer peripheral surface of the columnar portion 53 and the inner peripheral surface of the coil 2 and the coil 2 can be inserted into the columnar portion 53 without a problem such as contact of the columnar portion 53 with the inner peripheral surface of the coil 2.

In addition, in the present embodiment, the first positioning portion 43 of the terminal 4*a* and the first positioning portion 43 of the terminal 4*b* are disposed between the pair of end portions (wire ends 3*a* and 3*b*) of the coil 2. Accordingly, the positions of the winding part of the coil 2 and the end portions (wire ends 3*a* and 3*b*) can be regulated by the first positioning portions 43 of the terminals 4*a* and 4*b* and a positional deviation of the coil 2 with respect to the terminals 4*a* and 4*b* can be effectively prevented.

In addition, in the present embodiment, the distance L1 between the first positioning portion 43 of the terminal 4*a* and the first positioning portion 43 of the terminal 4*b* is smaller than the outer diameter D of the coil 2 as illustrated in FIG. 5B. Accordingly, a positional deviation of the coil 2 to the Y-axis positive direction side with respect to the terminals 4*a* and 4*b* and a positional deviation of the coil 2 in the X-axis direction can be prevented.

In addition, in the present embodiment, a projection (the folded piece 45*b*) functions as the connecting wire portion 45 of the terminals 4*a* and 4*b*. Accordingly, a positional deviation of the coil 2 with respect to the terminals 4*a* and 4*b* can be prevented by the projection (folded piece 45*b*) while the wire ends 3*a* and 3*b* are connected to the connecting wire portion 45.

Second Embodiment

An inductor 101 according to the second embodiment of the present invention differs only in the following points and the other configurations thereof are identical to those of the first embodiment described above. In the following description, the parts common to the first and second embodiments are denoted by the same reference numerals with detailed description thereof omitted.

Figure 7:
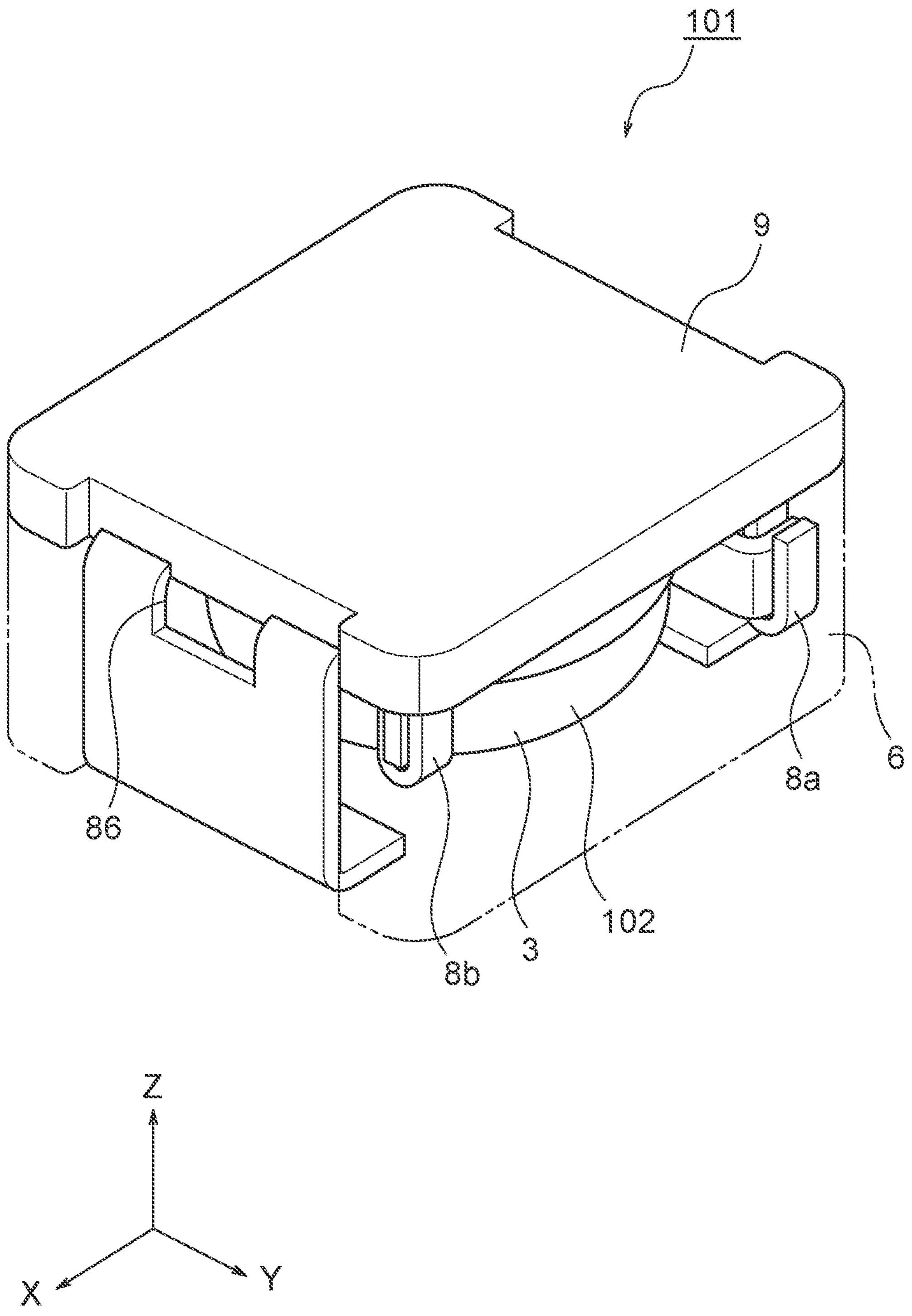
FIG. 7 is a perspective view of a coil device according to a second embodiment of the present invention.

As is apparent from comparison between FIGS. 1 and 7, the inductor 101 in the present embodiment is different from the inductor 1 in the first embodiment in that the inductor 101 has terminals 8*a* and 8*b* instead of the terminal 4*a*, has a first core 9 instead of the first core 5, and has a coil 102 instead of the coil 2.

Figure 8:
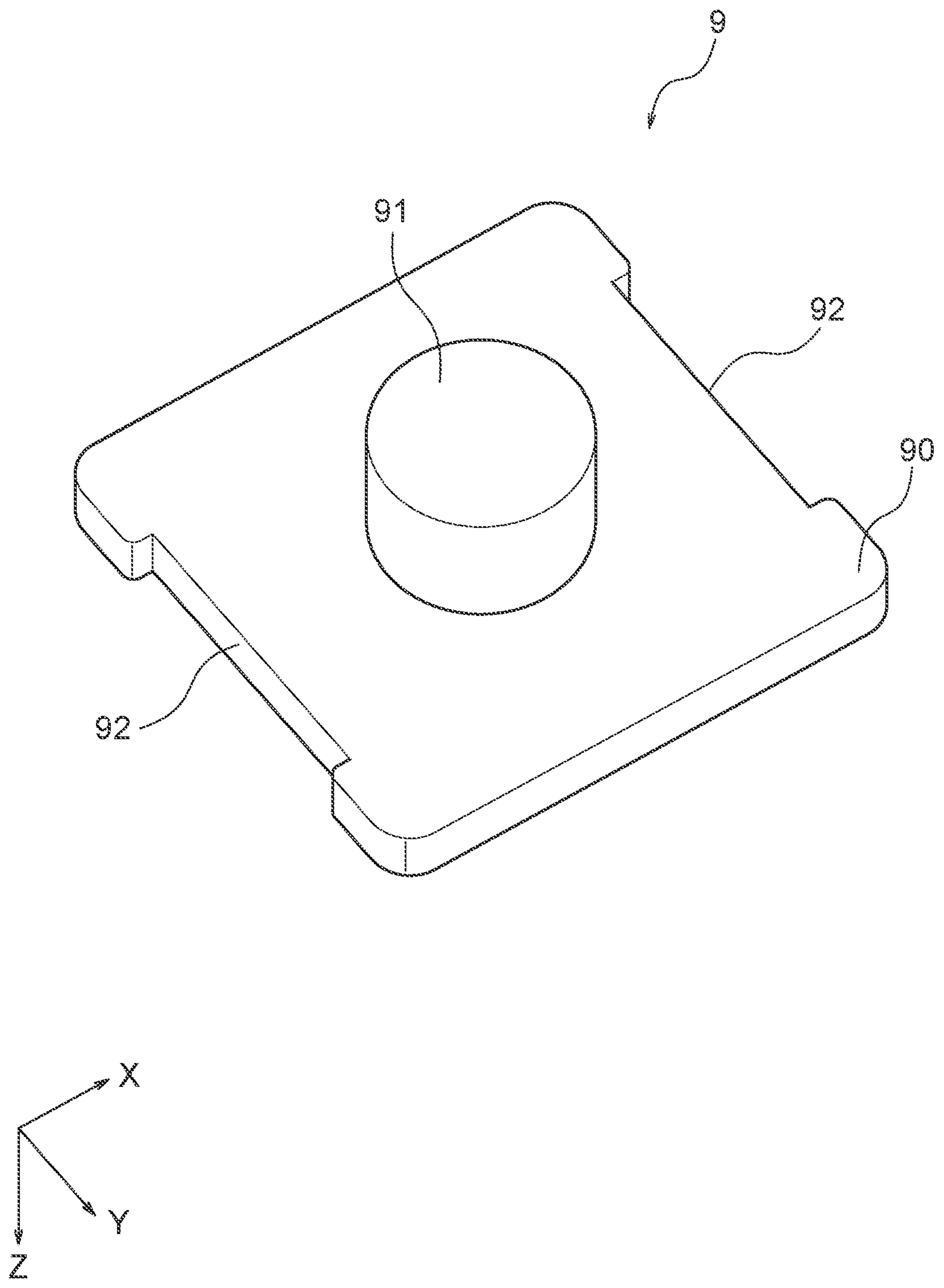
FIG. 8 is a perspective view of a first core illustrated in FIG. 7.

As illustrated in FIG. 8, the first core 9 has a base portion 90 and a columnar portion 91 formed on the surface (upper surface) of the base portion 90. The first core 9 and the second core 6 are joined on substantially the same plane. It should be noted that the upper surface of the base portion 90 faces the lower part of the inductor 101 when the inductor 101 is disposed such that the mounting surface faces downward as illustrated in FIG. 7.

The base portion 90 has a substantially rectangular parallelepiped shape (substantially flat shape), and its surface (upper surface) is flat. The upper surface of the base portion 90 is covered with the second core 6 illustrated in FIG. 7. A recessed portion 92 is formed in each side surface (each end portion) of the base portion 90 in the X-axis direction. Although the depth of the recessed portion 92 in the X-axis direction is not particularly limited, the depth is, for example, approximately equal to or larger than the plate thickness of the terminals 8*a* and 8*b*. The width of the recessed portion 92 in the Y-axis direction is approximately ½ to ⅔ of the width of the base portion 90 in the Y-axis direction and is substantially equal to the width of the terminals 8*a* and 8*b* illustrated in FIG. 7 in the Y-axis direction.

The columnar portion 91 is integrally formed in the substantially central portion of the base portion 90 and extends in the Z-axis direction. The coil (coreless coil) 102 illustrated in FIG. 7 is disposed (inserted or wound) in the columnar portion 91. Accordingly, the diameter of the columnar portion 91 is smaller than the inner diameter of the coil 102. The columnar portion 91 has a columnar shape, and its height is higher than the height of the coil 102. By the first core 9 being provided with the columnar portion 91, the effective magnetic permeability of the first core 9 in the region inside the coil 102 can be sufficiently ensured and the inductance characteristics of the inductor 101 can be satisfactory.

Figure 9:
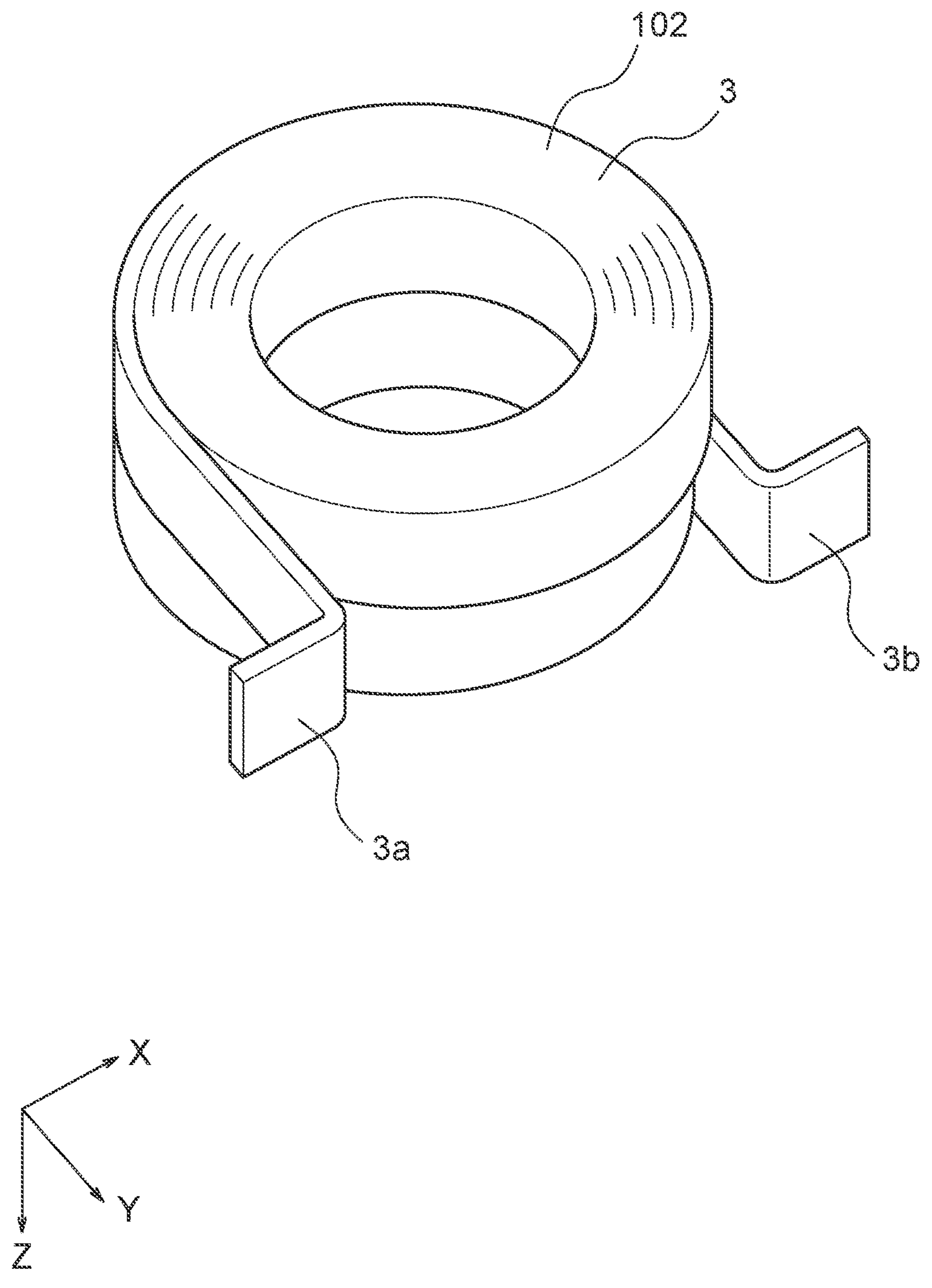
FIG. 9 is a perspective view of a coil illustrated in FIG. 7.

As illustrated in FIG. 9, a coreless coil constitutes the coil 102 in which the wire 3 made of a flat wire is wound flatwise. In the present embodiment, the coil 102 is a-wound. The long-side surface (width-direction surface) of the wire 3 constitutes the inner peripheral surface or the outer peripheral surface of the coil 102, and the width direction of the wire 3 is substantially parallel to the winding axis direction of the coil 102. The short-side surface (edge-side surface) of the wire 3 faces the Z-axis direction. The coil 102 is placed on the upper surface of the base portion 90 illustrated in FIG. 11.

The wire end 3*a* of the wire 3 is bent in a substantially L shape and is linearly pulled out along the Y-axis direction from the upper end of the coil 102 (winding part of the coil 102). The wire end 3*b* of the wire 3 is bent in a substantially L shape and is linearly pulled out along the Y-axis direction from the lower end of the coil 102 (winding part of the coil 102). The tip portion of the wire end 3*a* and the tip portion of the wire end 3*b* extend to opposite sides along the X-axis direction.

Figure 10:
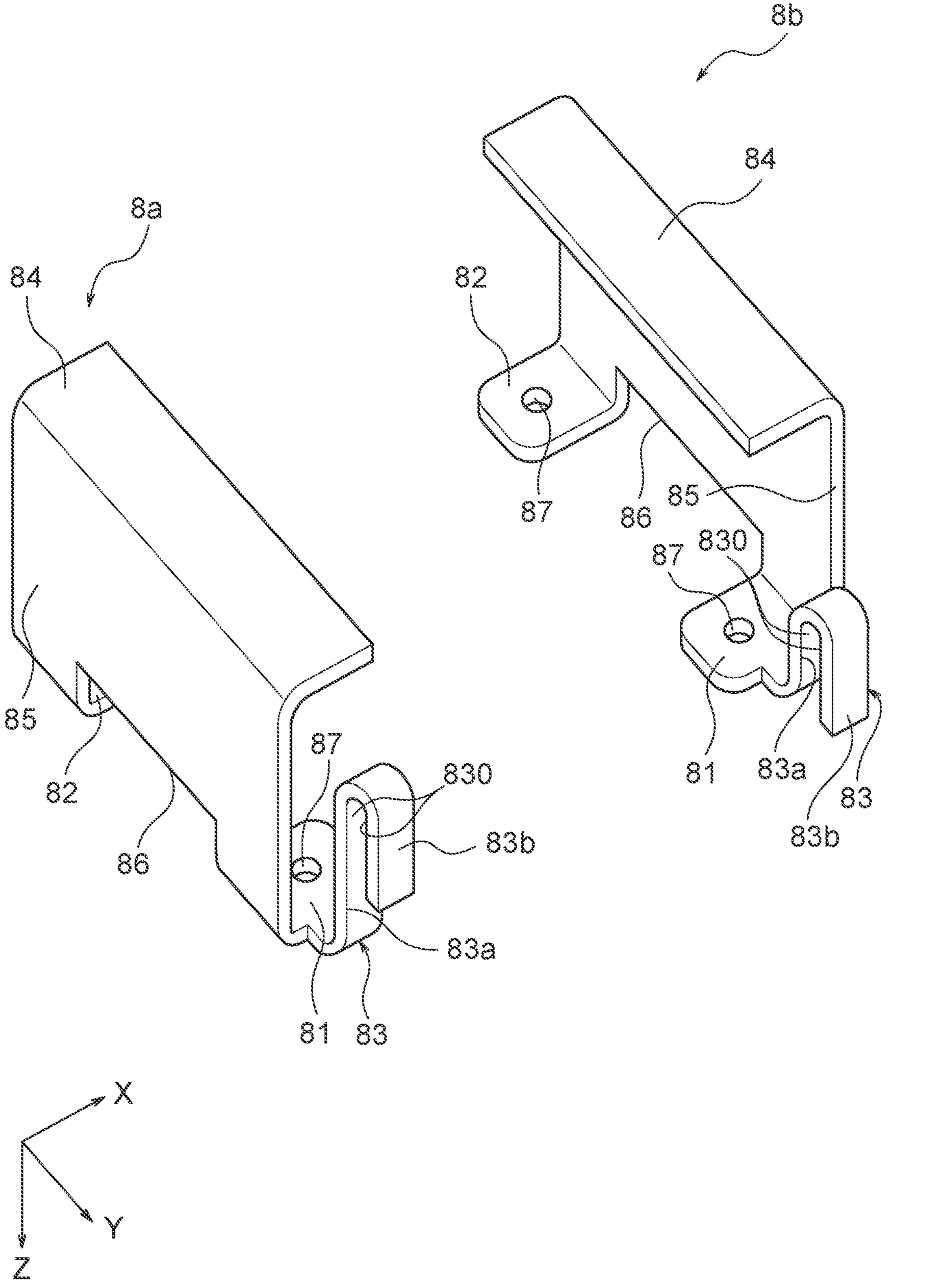
FIG. 10 is a perspective view of a terminal illustrated in FIG. 7.

As illustrated in FIG. 10, the terminals 8*a* and 8*b* have a first placement portion 81, a second placement portion 82, a connecting wire portion 83, a mounting portion 84, a connecting portion 85, a notch portion 86, and a fixing hole 87. It should be noted that the first placement portion 81, the second placement portion 82, the mounting portion 84, the connecting portion 85, and the notch portion 86 are respectively similar in configuration to the first placement portion 41, the second placement portion 42, the mounting portion 46, the connecting portion 47, and the notch portion 48 in the first embodiment and thus will not be described in detail.

The connecting wire portion 83 is integrally formed in the end portion on one side of the first placement portion 81 in the Y-axis direction. The width of the connecting wire portion 83 in the X-axis direction is narrower than the width of the first placement portion 81 in the X-axis direction. As a result, the size of the connecting wire portion 83 can be reduced. The end portion of the coil 102 illustrated in FIG. 9 is connected to the connecting wire portion 83. The connecting wire portion 83 of the terminal 8*a* and the connecting wire portion 83 of the terminal 8*b* are disposed so as to be oriented in the same direction (Y-axis direction). Accordingly, laser irradiation from the Y-axis positive direction side can be easily performed on the connecting wire portions 83 and 83 in a case where, for example, laser welding is performed on the connecting wire portions 83 and 83 and the manufacturing can be facilitated.

Figure 11:
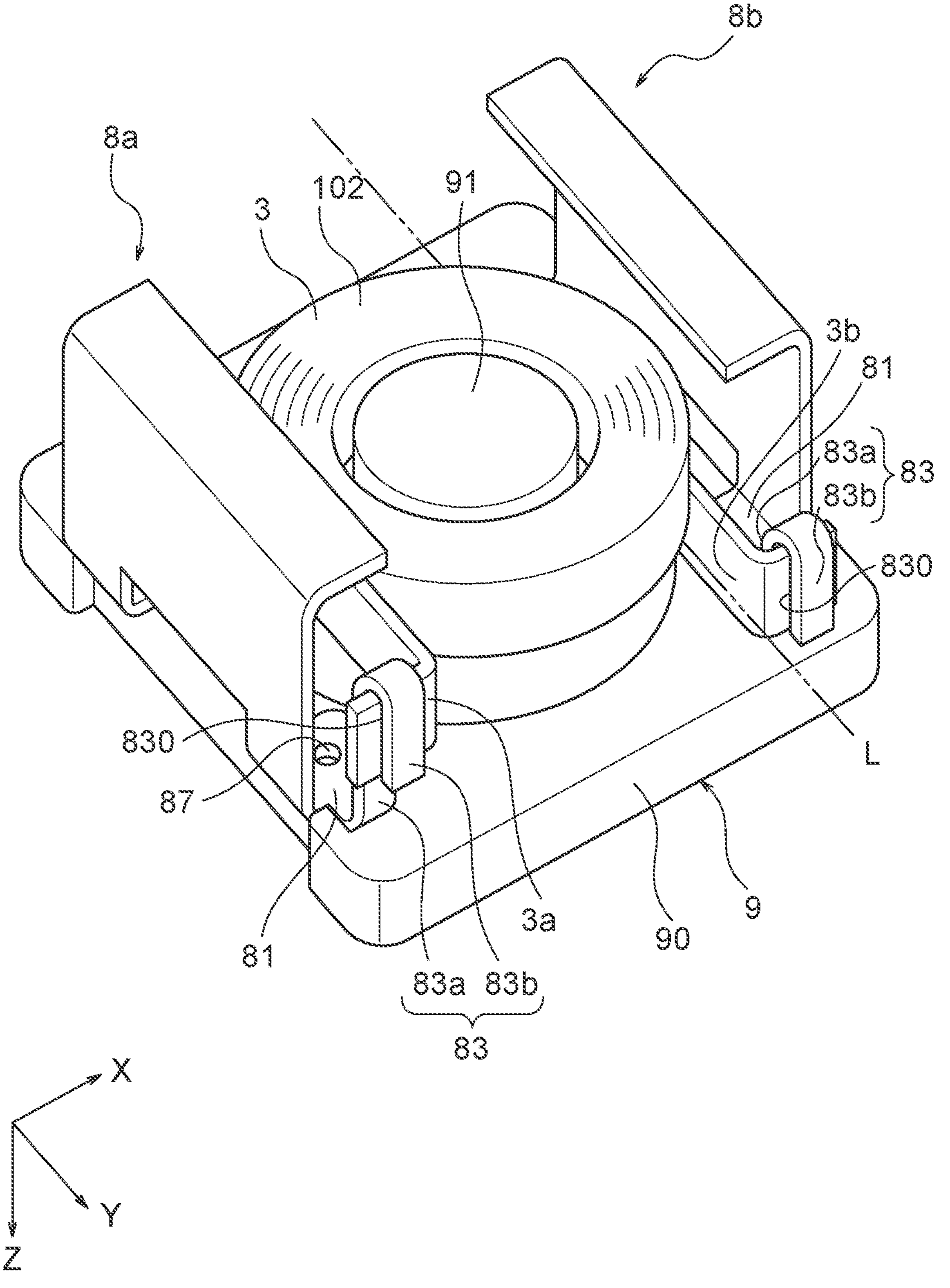
FIG. 11 is a perspective view in which the coil device illustrated in FIG. 7 is viewed from another angle.

As illustrated in FIG. 11, the connecting wire portion 83 of the terminal 8*b* is disposed on the outside (X-axis positive direction side) of a virtual line L parallel to the side surface (side surface vertically intersecting with the X axis with the terminal 8*b* fixed) of the second core 6 (FIG. 7) and in contact with the outer periphery of the coil 102. In the illustrated example, the virtual line L is parallel to the pull-out direction of the wire end 3*b* of the wire 3 and passes over the wire end 3*b*. Although not illustrated in detail, the same applies to the connecting wire portion 83 of the terminal 8*a*, which is disposed on the outside (X-axis negative direction side) of a virtual line parallel to the side surface (side surface vertically intersecting with the X axis with the terminal 8*a* fixed) of the second core 6 and in contact with the outer periphery of the coil 102.

When viewed from a direction perpendicular to the side surface (side surface to which the terminal 8*a* is fixed) of the second core 6 (FIG. 7), the connecting wire portion 83 of the terminal 8*a* and the remaining part of the terminal 8*a* excluding the connecting wire portion 83 (placement portions 81 and 82, mounting portion 84, connecting portion 85, etc.) are disposed so as to be positionally deviated in the Y-axis direction. Likewise, when viewed from a direction perpendicular to the side surface of the second core 6 (side surface to which the terminal 8*b* is fixed), the connecting wire portion 83 of the terminal 8*b* and the remaining part of the terminal 8*b* excluding the connecting wire portion 83 (placement portions 81 and 82, mounting portion 84, connecting portion 85, etc.) are disposed so as to be positionally deviated in the Y-axis direction.

As illustrated in FIG. 10, the connecting wire portion 83 has a fixed piece 83*a* and a folded piece 83*b*. The fixed piece 83*a* faces the folded piece 83*b* in the Y-axis direction and is integrally formed in the end portion on one side of the first placement portion 81 in the Y-axis direction. The fixed piece 83*a* is folded upward with the end portion on one side of the first placement portion 81 in the Y-axis direction serving as a folding point (fulcrum).

The length of the fixed piece 83*a* of the terminal 8*a* in the Z-axis direction is longer than the length of the fixed piece 83*a* of the terminal 8*b* in the Z-axis direction and is longer than the length of the folded piece 83*b* of the terminal 8*a* in the Z-axis direction. The length of the fixed piece 83*a* of the terminal 8*b* in the Z-axis direction is substantially equal to the length of the folded piece 83*b* of the terminal 8*b* in the Z-axis direction.

The folded piece 83*b* is integrally formed in the end portion on one side of the fixed piece 83*a* in the Z-axis direction and is folded downward with the end portion serving as a folding point (fulcrum). Both the fixed piece 83*a* and the folded piece 83*b* are formed so as to extend in the Z-axis direction and are disposed in the direction perpendicular to the upper surface of the base portion 90. During the manufacturing of the inductor 101, laser irradiation is performed on the outside surface of the folded piece 83*b* in the Y-axis direction and the surface functions as a laser irradiation surface.

As illustrated in FIG. 11, the connecting wire portion 83 of the terminal 8*a* sandwiches and holds the wire end 3*a* of the wire 3 with the fixed piece 83*a* and the folded piece 83*b*. The wire end 3*a* of the wire 3 is pulled out from the upper end of the coil 102, and thus the connecting wire portion 83 of the terminal 8*a* holds the wire end 3*a* above the upper surface of the base portion 90. The connecting wire portion 83 of the terminal 8*a* is embedded in the second core 6. It should be noted that the folded piece 83*b* of the terminal 8*a* is folded in a direction perpendicular to the fixed piece 85*a* and extends along the Y-axis direction before the wire end 3*a* is sandwiched.

The connecting wire portion 83 of the terminal 8*b* sandwiches and holds the wire end 3*b* of the wire 3 with the fixed piece 83*a* and the folded piece 83*b*. The wire end 3*b* of the wire 3 is pulled out from the upper end of the coil 102, and thus the connecting wire portion 83 of the terminal 8*b* holds the wire end 3*b* in a state of being placed on the upper surface of the base portion 90. The connecting wire portion 83 of the terminal 8*b* is sandwiched between the first core 9 and the second core 6. It should be noted that the folded piece 83*b* of the terminal 8*b* is folded in a direction perpendicular to the fixed piece 85*a* and extends along the Y-axis direction before the wire end 3*b* is sandwiched.

As illustrated in FIGS. 10 and 11, the connecting wire portion 83 is provided with a holding surface 830 holding the end portion of the coil 102. The holding surface 830 is a part corresponding to the abutting surface between the fixed piece 83*a* and the long-side surface of the wire ends 3*a* and 3*b* or the abutting surface between the folded piece 83*b* and the long-side surface of the wire ends 3*a* and 3*b*. The holding surface 830 of the connecting wire portion 83 of the terminal 8*a* and the holding surface 830 of the connecting wire portion 83 of the terminal 8*b* are oriented in the same direction (Y-axis direction).

When the long-side surface of the wire ends 3*a* and 3*b* of the wire 3 is held by the connecting wire portion 83, the holding surface 830 is disposed so as to be substantially parallel to the side surface of the second core 6 illustrated in FIG. 7 (side surface vertically intersecting with the Y axis with the terminals 8*a* and 8*b* not fixed) and is disposed so as to be substantially perpendicular to the upper surface of the base portion 90. Alternatively, the holding surface 830 may be disposed so as to be slightly inclined with respect to the side surface of the second core 6.

The holding surface 830 is disposed so as to be substantially parallel to the winding axis of the coil 102. The sandwiching direction at a time when the wire ends 3*a* and 3*b* of the wire 3 are sandwiched between the fixed piece 83*a* and the folded piece 83*b* is substantially perpendicular to the winding axis of the coil 102 and is substantially perpendicular to the holding surface 830 (the normal direction of the holding surface 830).

The holding surface 830 (abutting surface) of the wire ends 3*a* and 3*b* in the fixed piece 83*a*, the holding surface 830 (abutting surface) of the wire ends 3*a* and 3*b* in the folded piece 83*b*, and the long-side surface of the wire ends 3*a* and 3*b* are disposed so as to be substantially parallel and face the side surface of the second core 6 (side surface vertically intersecting with the Y axis).

As illustrated in FIG. 10, the fixing hole (opening) 87 is formed in each of the first placement portion 81 and the second placement portion 82. When the second core 6 is formed, the material forming the second core 6 (mixture containing magnetic powder and binder resin) enters the fixing hole 87 in a press mold. As a result, the terminals 8*a* and 8*b* can be firmly fixed to the second core 6.

As illustrated in FIG. 11, the connecting wire portion 83 and the coil 102 are disposed on substantially the same plane of the base portion 90. In the present embodiment, the connecting wire portion 83 of the terminals 8*a* and 8*b* is disposed on the first core 9 (base portion 90) around the connecting wire portion 83 and the second core 6 illustrated in FIG. 7 is disposed on the connecting wire portion 83. Accordingly, the connecting wire portion 83 can be disposed between the first core 9 and the second core 6, the connecting wire portion 83 can be effectively protected from an external factor such as an external force, and the occurrence of open circuit failure can be prevented. In addition, by the connecting wire portion 83 being disposed on the first core 9, a positional deviation of the connecting wire portion 83 can be prevented when the second core 6 is disposed on the connecting wire portion 83.

Figure 12A:
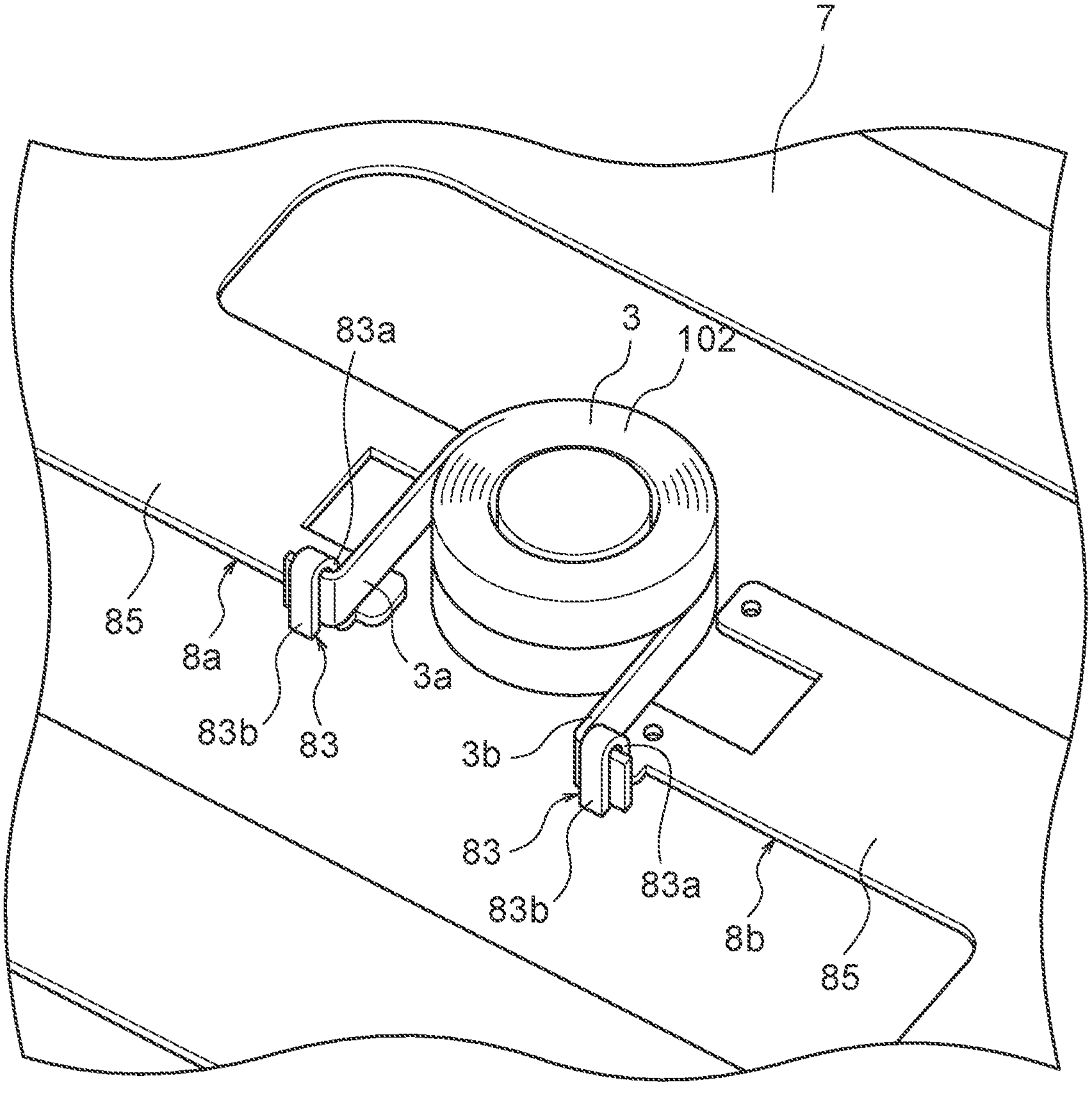
FIG. 12A is a diagram illustrating a method for manufacturing the coil device illustrated in FIG. 7.

Next, a method for manufacturing the inductor 101 will be described with reference to FIGS. 12A to 12E and the like. In the method of the present embodiment, a conductive plate such as a metal plate (such as a Sn-plated metal plate) is punched first into a shape as illustrated in FIG. 12A. As illustrated in FIG. 12A, the terminals 8*a* and 8*b* connected to the frame 7 via the connecting portion 85 are formed on the conductive plate after the punching.

Next, the terminals 8*a* and 8*b* are connected to the respective end portions of the coil 102 illustrated in FIG. 9 (wire ends 3*a* and 3*b* of the wire 3). More specifically, the coil 102 is disposed between the terminals 8*a* and 8*b*, the wire ends 3*a* and 3*b* are sandwiched (held) between the fixed piece 83*a* and the folded piece 83*b*, and the wire ends 3*a* and 3*b* are connected to the connecting wire portion 83.

Figure 12B:
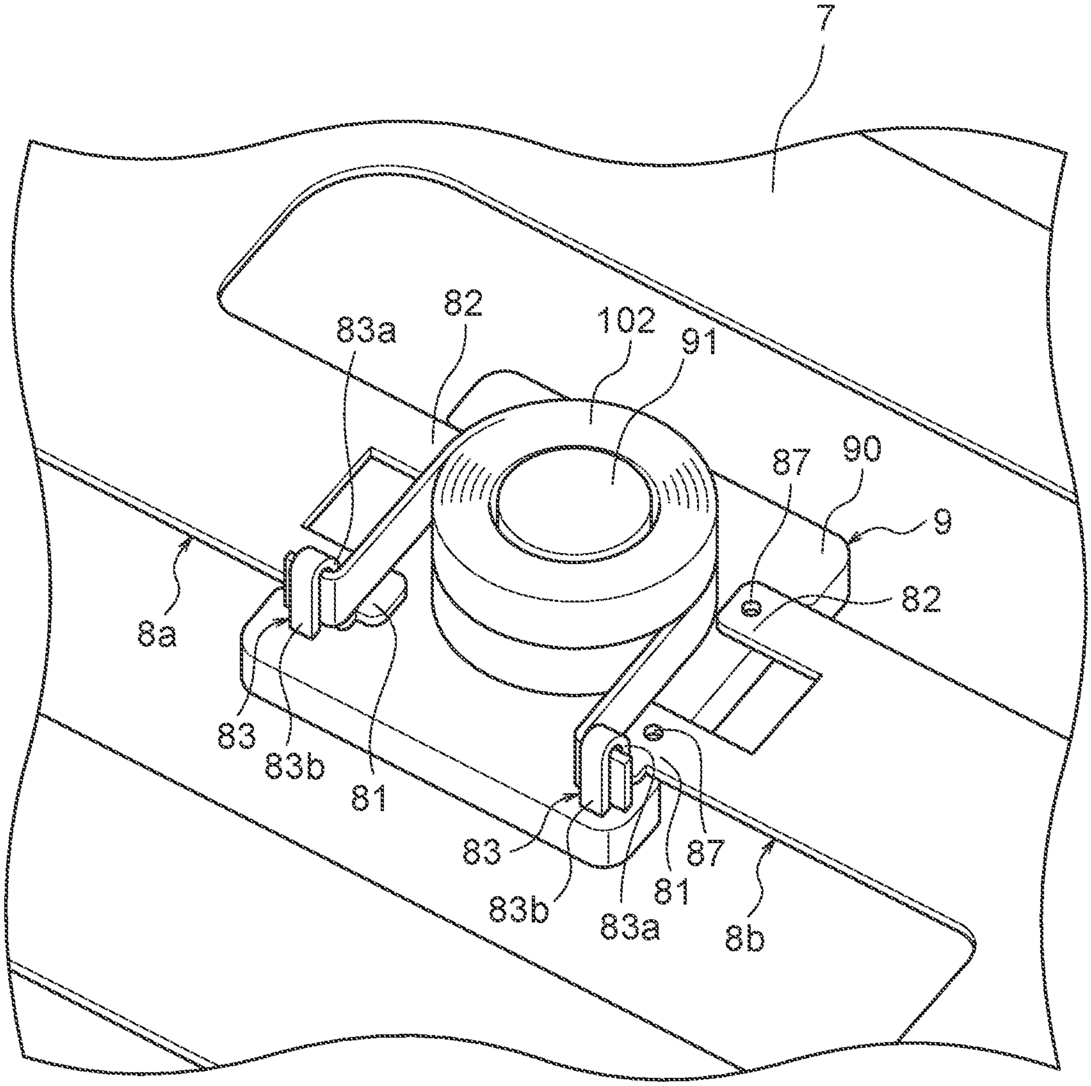
FIG. 12B is a diagram illustrating the process subsequent to FIG. 12A.

Next, as illustrated in FIG. 12B, the first core 9 illustrated in FIG. 8 is combined with the coil 102 with the terminals 8*a* and 8*b* fixed to the respective end portions. A temporary assembly is configured as a result. More specifically, the columnar portion 91 of the first core 9 is inserted inside the coil 102 and the coil 102 is placed on the upper surface of the base portion 90. In addition, the placement portions 81 and 82 of the terminals 8*a* and 8*b* are placed on the upper surface of the base portion 90. A pre-molded core (temporarily molded core) is used as the first core 9.

Laser welding is performed on the connecting wire portion 83 before or after the configuration of the temporary assembly (that is, in the state illustrated in FIG. 12A or FIG. 12B). The laser welding is performed by, for example, performing laser emission toward the folded piece 83*b* from the side of the connecting wire portion 83 (direction perpendicular to the folded piece 83*b*). A laser ball (not illustrated) is formed at the part irradiated with the laser.

Figure 12C:
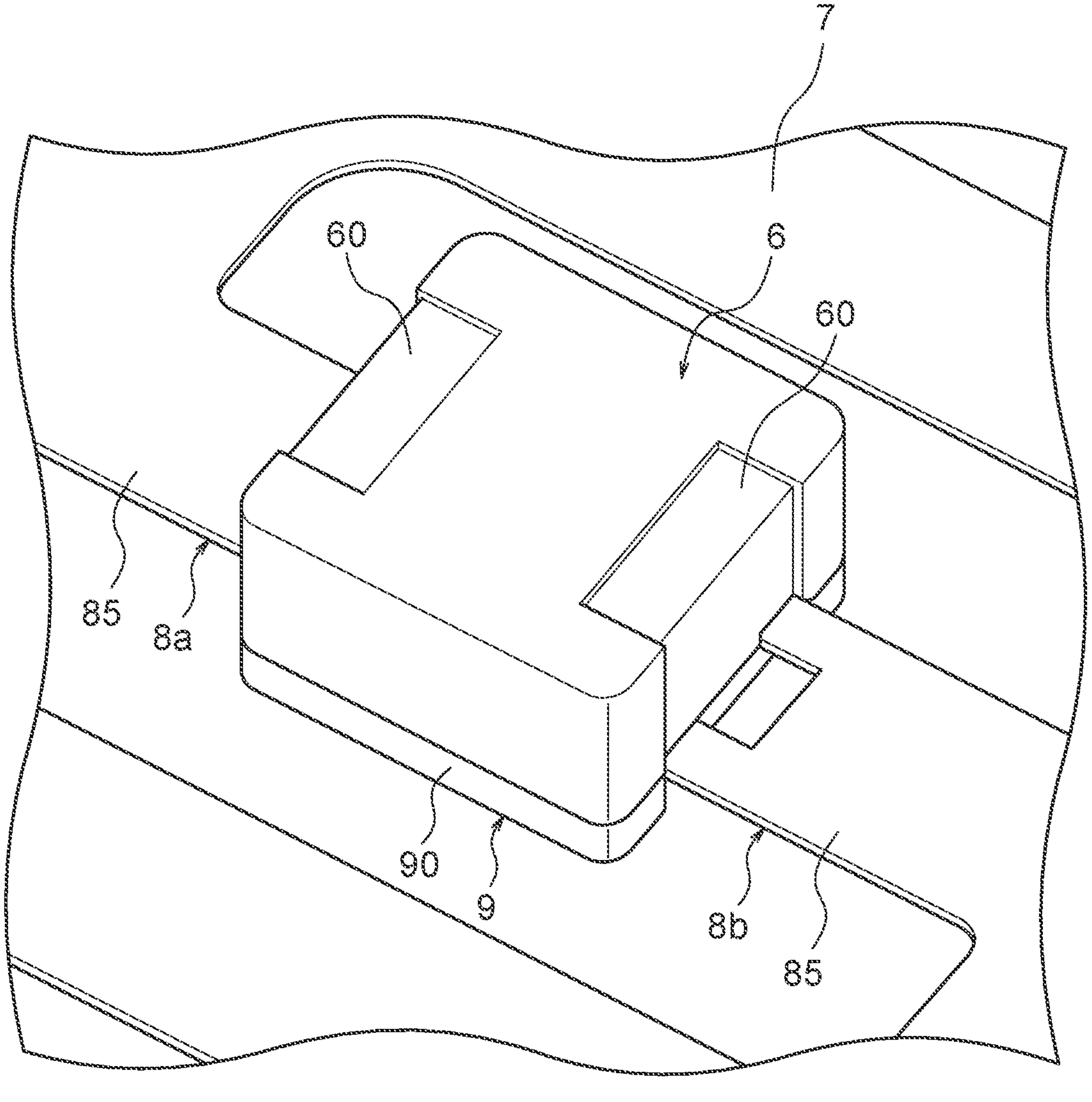
FIG. 12C is a diagram illustrating the process subsequent to FIG. 12B.

Next, the temporary assembly illustrated in FIG. 12B is inserted into the press mold and the second core 6 is formed by injection molding in the press mold. At this time, the connecting portion 85 of the terminals 8*a* and 8*b* is exposed from the press mold. During the injection molding, a mixture containing magnetic powder and binder resin is fluidized by heating or the like, injected into the press mold, and solidified by cooling or the like. The second core 6 illustrated in FIG. 12C is obtained as a result. At this time, the mixture enters the fixing holes 87 of the terminals 8*a* and 8*b*, and thus the terminals 8*a* and 8*b* can be fixed to the second core 6 with sufficient fixing strength.

In the example illustrated in FIG. 12C, the step portion 60 is formed on the surface of the second core 6 so as to straddle the side and bottom surfaces thereof. The mounting portion 84 (FIG. 10) of the terminals 8*a* and 8*b* can be disposed at a part of the step portion 60 formed on the bottom surface of the second core 6. The connecting portion 85 of the terminals 8*a* and 8*b* can be disposed at a part of the step portion 60 formed on the side surface of the second core 6.

Figure 12D:
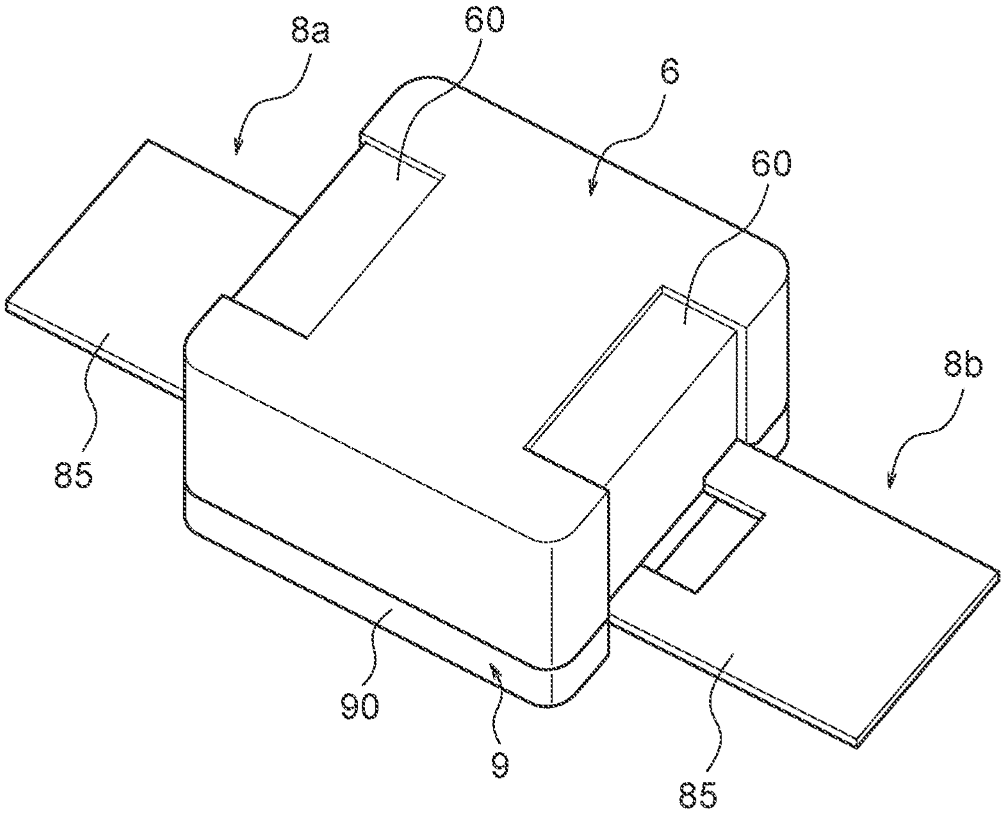
FIG. 12D is a diagram illustrating the process subsequent to FIG. 12C.
Figure 12E:
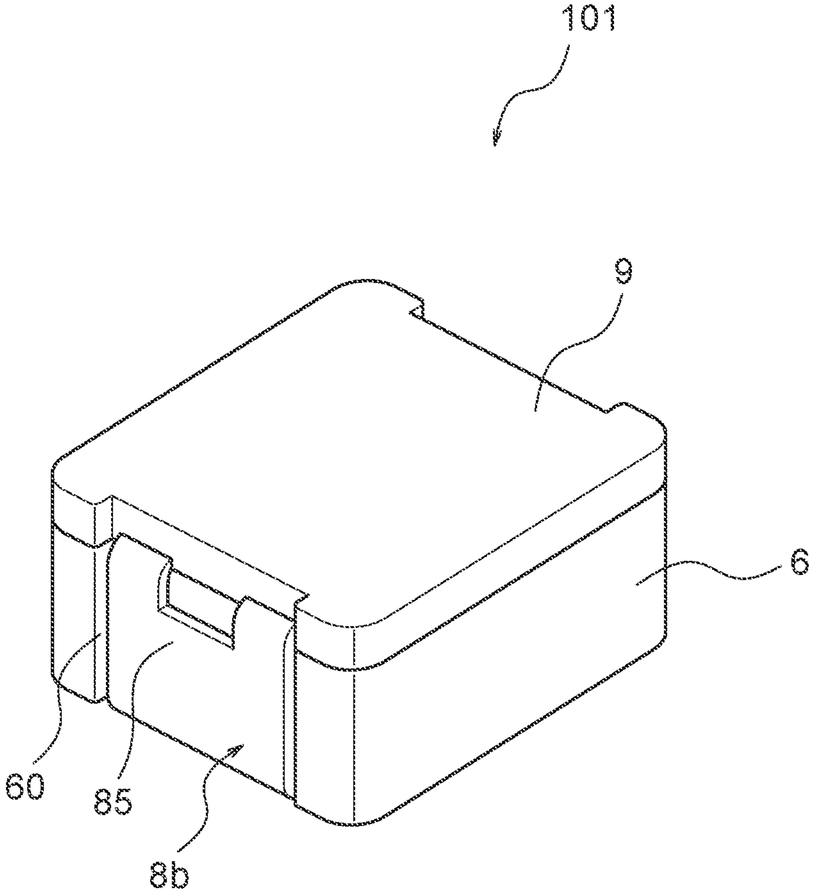
FIG. 12E is a diagram illustrating the process subsequent to FIG. 12D.

Next, as illustrated in FIG. 12D, the frame 7 illustrated in FIG. 12C is cut with a cutting tool and removed. As illustrated in FIG. 12E, the part left after the removal (connecting portion 85) is fixed to the step portion 60. More specifically, as illustrated in FIG. 12E, the connecting portion 85 of the terminals 8*a* and 8*b* is folded substantially vertically from the state illustrated in FIG. 12D and the connecting portion 85 is fixed to a part of the step portion 60 formed on the side surface of the second core 6. In addition, in that state, the tip portion of the connecting portion 85 is folded substantially vertically and fixed to a part of the step portion 60 formed on the bottom surface of the second core 6. The inductor 101 according to the present embodiment can be obtained in this manner.

In the inductor 101 according to the present embodiment, the holding surface 830 of the connecting wire portion 83 extends in parallel to the winding axis of the coil 102. In the coil 102 formed by winding a flat wire flatwise, the long-side surface of the end portions (wire ends 3*a* and 3*b* of the wire 3) also extends in parallel to the winding axis. Accordingly, the directions of the long-side surface and the holding surface 830 of the connecting wire portion 83 can be aligned, even without the wire ends 3*a* and 3*b* being twisted, when the wire ends 3*a* and 3*b* are pulled out from the winding part of the coil 102. Accordingly, the wire ends 3*a* and 3*b* can be held by the holding surface 830 without being twisted, unevenness in the inductance characteristics of the inductor 101 can be prevented, and the highly reliable inductor 101 can be realized.

In addition, in the present embodiment, the holding surface 830 faces the side surface of the second core 6 (side surface vertically intersecting with the Y axis). Accordingly, laser irradiation along the Y-axis direction can be easily performed from the side of the inductor 101 in a case where, for example, laser welding is performed on the connecting wire portion 83 (holding surface 830) and the manufacturing can be facilitated.

In addition, in the present embodiment, the wire ends 3*a* and 3*b* are bent in a substantially L shape. Accordingly, the long-side surface of the wire ends 3*a* and 3*b* is capable of facing the side surface of the second core 6 (side surface vertically intersecting with the Y axis) with ease. Accordingly, when the wire ends 3*a* and 3*b* are held by the holding surface 830 of the connecting wire portion 83, the holding surface 830 is disposed so as to face the side surface of the second core 6 (side surface vertically intersecting with the Y axis) and the laser irradiation along the Y-axis direction is easily performed from the side of the inductor 101.

In addition, in the present embodiment, the connecting wire portion 83 is disposed outside the virtual line L parallel to the side surface of the second core 6 (side surface vertically intersecting with the X axis) and in contact with the outer periphery of the coil 102. Accordingly, the connecting wire portion 83 can be disposed at a position sufficiently separated from the coil 102. Accordingly, in a case where laser welding is performed on the connecting wire portion 83, the laser irradiating the winding part of the coil 102 in part can be prevented and damage to the winding part of the coil 102 can be reduced. In addition, the laser irradiating the first core 9 in part can be prevented and damage to the first core 9 can also be reduced.

In addition, when viewed from the direction perpendicular to the side surface of the second core 6 (side surface vertically intersecting with the X axis with the terminals 8*a* and 8*b* fixed) in the present embodiment, the connecting wire portion 83 and the remaining part of the terminals 8*a* and 8*b* excluding the connecting wire portion 83 (placement portions 81 and 82, mounting portion 84, and connecting portion 85) are disposed so as to be positionally deviated. Accordingly, the connecting wire portion 83 can be disposed at a position sufficiently separated from the coil 102 toward the direction parallel to the side surface of the second core 6 and the effect described above can be obtained in a case where laser welding is performed on the connecting wire portion 83.

In addition, in the present embodiment, the cores 9 and 6 contain magnetic particles and a resin binder. Accordingly, the inductor 101 having satisfactory inductance characteristics can be realized.

In addition, in the present embodiment, the holding surface 830 of the terminal 8*a* and the holding surface 830 of the terminal 8*b* face the same direction (Y-axis positive direction side). Accordingly, laser irradiation can be easily performed on the connecting wire portion 83 (holding surface 830) in a case where, for example, laser welding is performed on the connecting wire portion 83 (holding surface 830) of the terminals 8*a* and 8*b* and the manufacturing can be facilitated.

Third Embodiment

An inductor 201 according to the third embodiment of the present invention differs only in the following points and the other configurations thereof are identical to those of the first embodiment described above. In the following description, the parts common to the second and third embodiments are denoted by the same reference numerals with detailed description thereof omitted.

Figure 13:
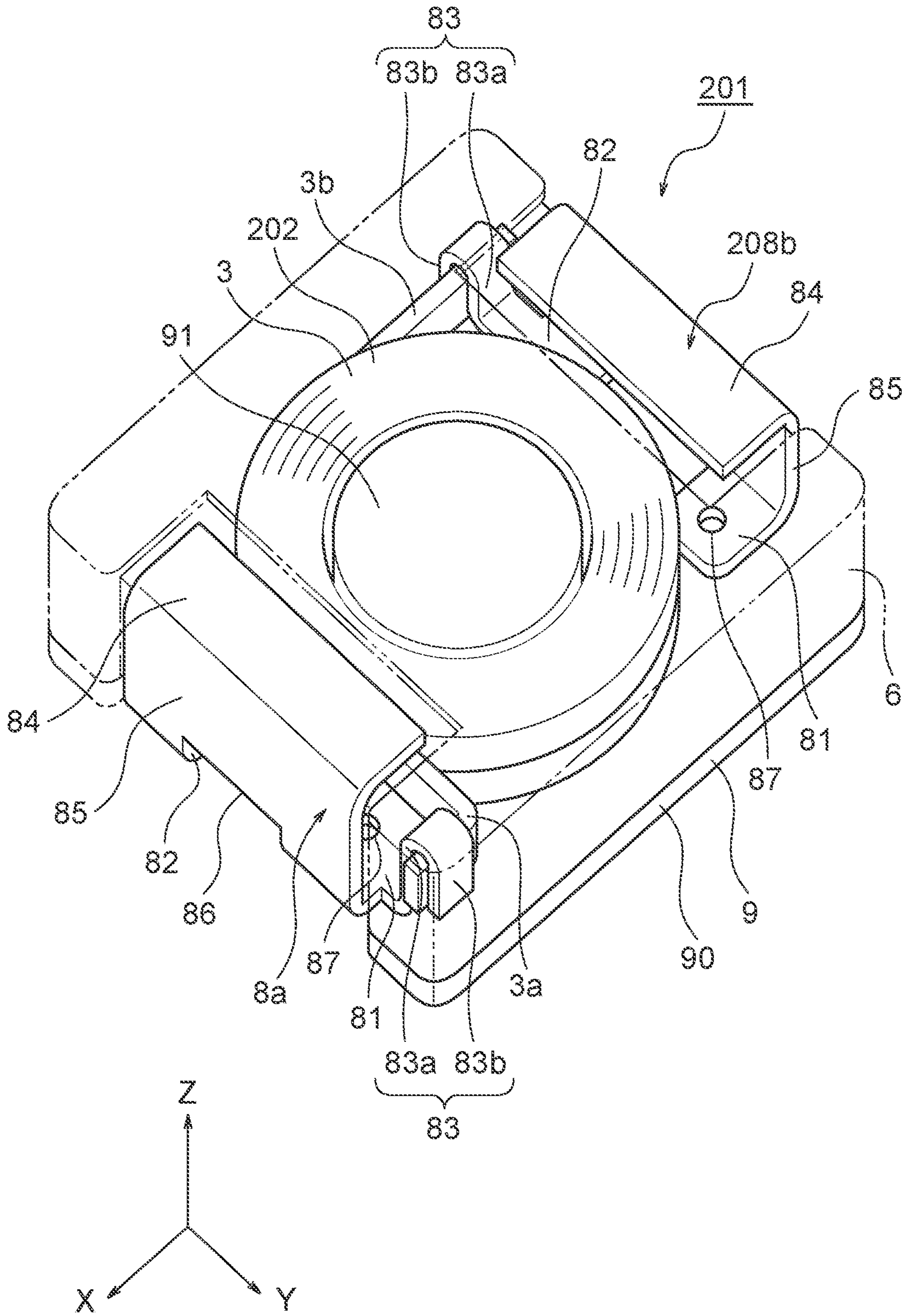
FIG. 13 is a perspective view of a coil device according to a third embodiment of the present invention.

As illustrated in FIG. 13, the inductor 201 is different from the inductor 101 in the second embodiment in that the inductor 201 has a coil 202 instead of the coil 102 and a terminal 208*b* instead of the terminal 8*b*. The terminal 208*b* is different from the terminal 8*b* (FIG. 10) in the second embodiment in that the connecting wire portion 83 is connected to the end portion on the other end side of the second placement portion 82 in the Y-axis direction. A folded piece 85*b* of the connecting wire portion 83 faces the side surface on the other side of the second core 6 in the Y-axis direction.

In the coil 202, one end portion (the wire end 3*a*) is pulled out to the Y-axis positive direction side toward the side surface of the second core 6 (side surface vertically intersecting with the Y axis). The tip portion of the wire end 3*a* is bent in a substantially L shape and extends along the X-axis direction. The other end portion (wire end 3*b*) is pulled out to the X-axis negative direction side toward the side surface of the second core 6 (side surface vertically intersecting with the X axis). The tip portion of the wire end 3*b* is not bent and extends straight along the X-axis direction.

The present embodiment is similar in effect to the second embodiment. In addition, in the present embodiment, the connecting wire portion 83 of the terminal 8*a* and the connecting wire portion 83 of the terminal 208*b* are disposed diagonally with the coil 202 interposed therebetween. Accordingly, the wire end 3*b* can be held by the connecting wire portion 83 of the terminal 208*b* disposed so as to face the side surface of the second core 6 (side surface vertically intersecting with the Y axis) in a state where the wire end 3*b* is pulled out straight without being bent in a substantially L shape. Accordingly, laser irradiation along the Y-axis direction can be easily performed on the connecting wire portion 83 of the terminal 208*b* from the side of the inductor 201.

It should be noted that the present invention is not limited to the embodiments described above and can be variously modified within the scope of the present invention.

Although an application example regarding the inductor of the present invention has been illustrated in each of the embodiments described above, the present invention may be applied to a coil device other than the inductor.

Although the winding shape of the wire 3 is a round spiral shape in each of the embodiments described above, the shape may be, for example, an elliptical spiral shape, a square spiral shape, or the like.

Although a flat wire constitutes the wire 3 in the first embodiment described above, the wire 3 may be constituted by a round wire, a quadratic wire, or a litz wire.

In the first embodiment described above, the connecting wire portion 45 of the terminal 4*a* and the connecting wire portion 45 of the terminal 4*b* may be disposed diagonally with the coil 2 interposed therebetween.

In the first embodiment described above, the base portion 50 may have a flat upper surface with the recessed portions 51*a* to 51*d*, the projecting portions 52*a* to 52*d*, and the protruding portion 54 omitted from the base portion 50.

In the first embodiment described above, a part of the upper surface or the side surface of the first core 5 may be covered with the second core 6. The same applies to the second and third embodiments.

In the first embodiment described above, the connecting portion 47 of the terminals 4*a* and 4*b* may be folded toward the first core 5 side. The same applies to the second and third embodiments.

Although the coil 2 is formed by winding the wire 3 edgewise in the first embodiment described above, the coil 2 may be formed by winding the wire 3 flatwise.

In the first embodiment described above, opening portions may be formed in the placement portions 41 and 42 of the terminals 4*a* and 4*b*. When the second core 6 is formed with such a configuration, the material forming the second core 6 (mixture containing magnetic powder and binder resin)

enters the opening portion in the press mold and the terminals 4*a* and 4*b* can be firmly fixed to the second core 6.

In the first embodiment described above, neither the positioning portions 43 and 44 of the terminal 4*a* nor the positioning portions 43 and 44 of the terminal 4*b* abut against the outer peripheral surface of the coil 2. Alternatively, any of the four positioning portions 43 and 44 may abut against the outer peripheral surface of the coil 2.

In the first embodiment described above, any of the positioning portions 43 and 44 of the terminal 4*a* and the positioning portions 43 and 44 of the terminal 4*b* may be omitted. For example, the second positioning portion 44 may be omitted from the terminals 4*a* and 4*b* or the first positioning portion 43 may be omitted from the terminals 4*a* and 4*b*.

Although the two cores of the first core 5 and the second core 6 constitute the core portion of the inductor 1 in the first embodiment described above, the core portion of the inductor 1 may be constituted by one core. In this case, the core may be formed by dust molding, injection molding, or the like. The same applies to the second embodiment and the third embodiment.

In the second embodiment described above, the holding surfaces 830 of the connecting wire portions 83 (fixed piece 83*a* and folded piece 83*b*) of the terminals 8*a* and 8*b* face the Y-axis direction. Alternatively, the holding surfaces 830 may face the X-axis direction. In other words, the holding surfaces 830 of the connecting wire portions 83 (fixed piece 83*a* and folded piece 83*b*) may be disposed so as to be substantially parallel to the side surface of the second core 6 (side surface vertically intersecting with the X axis with the terminals 8*a* and 8*b* fixed). The same applies to the third embodiment.

In the second embodiment described above, the connecting wire portion 83 is not limited to the configuration illustrated in FIG. 10 and the shape thereof may be changed as appropriate. For example, the folded piece 83*b* may be omitted from the connecting wire portion 83.

EXPLANATIONS OF LETTERS OR NUMERALS

1, 101, 201 INDUCTOR (COIL DEVICE)
2, 102, 202 COIL
3 WIRE
  3*a*, 3*b* WIRE END
4*a*, 4*b* TERMINAL
  41 FIRST PLACEMENT PORTION
  42 SECOND PLACEMENT PORTION
  43 FIRST POSITIONING PORTION
  44 SECOND POSITIONING PORTION
  45 CONNECTING WIRE PORTION
  45*a* FIXED PIECE
  45*b* FOLDED PIECE
  46 MOUNTING PORTION
  47 CONNECTING PORTION
  48 NOTCH PORTION
  149 FIXING HOLE
5 FIRST CORE
  50 BASE PORTION
  51*a* TO 51*d* FIRST RECESSED PORTION TO FOURTH RECESSED PORTION
  52*a* TO 52*d* FIRST PROJECTING PORTION TO FOURTH PROJECTING PORTION
  53 COLUMNAR PORTION
  54 PROTRUDING PORTION
6 SECOND CORE
  60 STEP PORTION
7 FRAME
8*a*, 8*b*, 208*b* TERMINAL
  81 FIRST PLACEMENT PORTION
  82 SECOND PLACEMENT PORTION
  83 CONNECTING WIRE PORTION
  83*a* FIXED PIECE
  83*b* FOLDED PIECE
  830 HOLDING SURFACE
  84 MOUNTING PORTION
  85 CONNECTING PORTION
  86 NOTCH PORTION
  87 FIXING HOLE
9 FIRST CORE
  90 BASE PORTION
  91 COLUMNAR PORTION
  92 RECESSED PORTION

What is claimed is:

1. A coil device comprising:
a coil made by winding a flat wire flatwise, with width-direction surfaces of the wire parallel to a winding axis of the coil, the flat wire having a thickness, two opposing flat surfaces and edges bridging the opposing flat surfaces across the thickness, the width-direction surfaces of the wire being the opposing flat surfaces;
a terminal having a connecting wire portion provided with a holding surface holding an end portion of a lead portion pulled out from the coil; and
a core covering the connecting wire portion together with the coil,
wherein the lead portion has a main portion linearly pulled out from an outer periphery of the coil,
the end portion of the lead portion is bent outward from the main portion in a L shape manner, in a lateral direction perpendicular to both the winding axis and a direction in which the main portion extends,
the width-direction surfaces of the wire at the end portion of the lead portion is sandwiched between a fixed piece and a folded piece of the connecting wire portion,
the holding surface is disposed on the fixed piece or the folded piece,
the holding surface extends so as to be parallel to the winding axis, and
the fixed piece and the folded piece are disposed outside the width-direction surfaces of the wire at the main portion of the lead portion, in the lateral direction.

2. The coil device according to claim 1, wherein the holding surface is parallel to at least one side surface of the core.

3. The coil device according to claim 1, wherein the connecting wire portion is positioned protruding from a remaining part of the terminal excluding the connecting wire portion, when viewed from the lateral direction, in which the end portion extends.

4. The coil device according to claim 1, wherein
the terminal has a placement portion disposed in the core, and
an opening is formed in the placement portion.

5. The coil device according to claim 1, wherein the core contains magnetic particles and a resin binder.

6. The coil device according to claim 1, wherein the terminal comprises a pair of the terminals, and
the holding surface of one of the terminals is parallel to the holding surface of the other terminal.

7. The coil device according to claim 1, wherein the terminal comprises a pair of the terminals, and the connecting wire portion of one of the terminals and the connecting wire portion of the other terminal are disposed diagonally with the coil interposed therebetween.

* * * * *